United States Patent [19]
Kobayashi et al.

[11] Patent Number: 4,887,120
[45] Date of Patent: * Dec. 12, 1989

[54] ELECTRONIC FLASH PHOTOGRAPHING SYSTEM

[75] Inventors: Mikio Kobayashi, Kanagawa; Akira Ueno, Tokyo, both of Japan

[73] Assignee: Ricoh Company, Ltd., Tokyo, Japan

[*] Notice: The portion of the term of this patent subsequent to Oct. 12, 2004 has been disclaimed.

[21] Appl. No.: 697,777

[22] Filed: Feb. 4, 1985

[30] Foreign Application Priority Data

Feb. 4, 1984 [JP] Japan .................................. 59-17657
Feb. 4, 1984 [JP] Japan .................................. 59-17658
Feb. 27, 1984 [JP] Japan .................................. 59-34292

[51] Int. Cl.$^4$ ............................................. G03B 15/05
[52] U.S. Cl. .................... 354/416; 354/145.1
[58] Field of Search ............... 354/412, 413, 414, 415, 354/416, 420, 421, 422, 423, 127.1, 127.12, 145.1

[56] References Cited
U.S. PATENT DOCUMENTS

| | | | |
|---|---|---|---|
| 4,422,744 | 12/1983 | Maida | 354/145.1 |
| 4,436,396 | 3/1984 | Maida | 354/127.12 |
| 4,457,601 | 7/1984 | Kondo et al. | 354/420 |
| 4,477,164 | 10/1984 | Makai et al. | 354/412 |
| 4,491,404 | 1/1985 | Hasegawa et al. | 354/127.1 |

Primary Examiner—Russell E. Adams
Attorney, Agent, or Firm—Oblon, Spivak, McClelland, Maier & Neustadt

[57] ABSTRACT

An electronic flash photographing system transmits a timing clock signal from a camera to a flash unit through a first signal transmission path, and also transmits a plurality of information signals as a serial signal from the flash unit to the camera through a second signal transmission path in synchronism with the timing clock signal. At least when a subject is photographed, generation of the timing clock signal is stopped or transmission thereof to the first signal transmission path is interrupted. While the subject is being photographed, a light-emission stop signal is transmitted from the camera to the flash unit through the first signal transmission path.

2 Claims, 15 Drawing Sheets

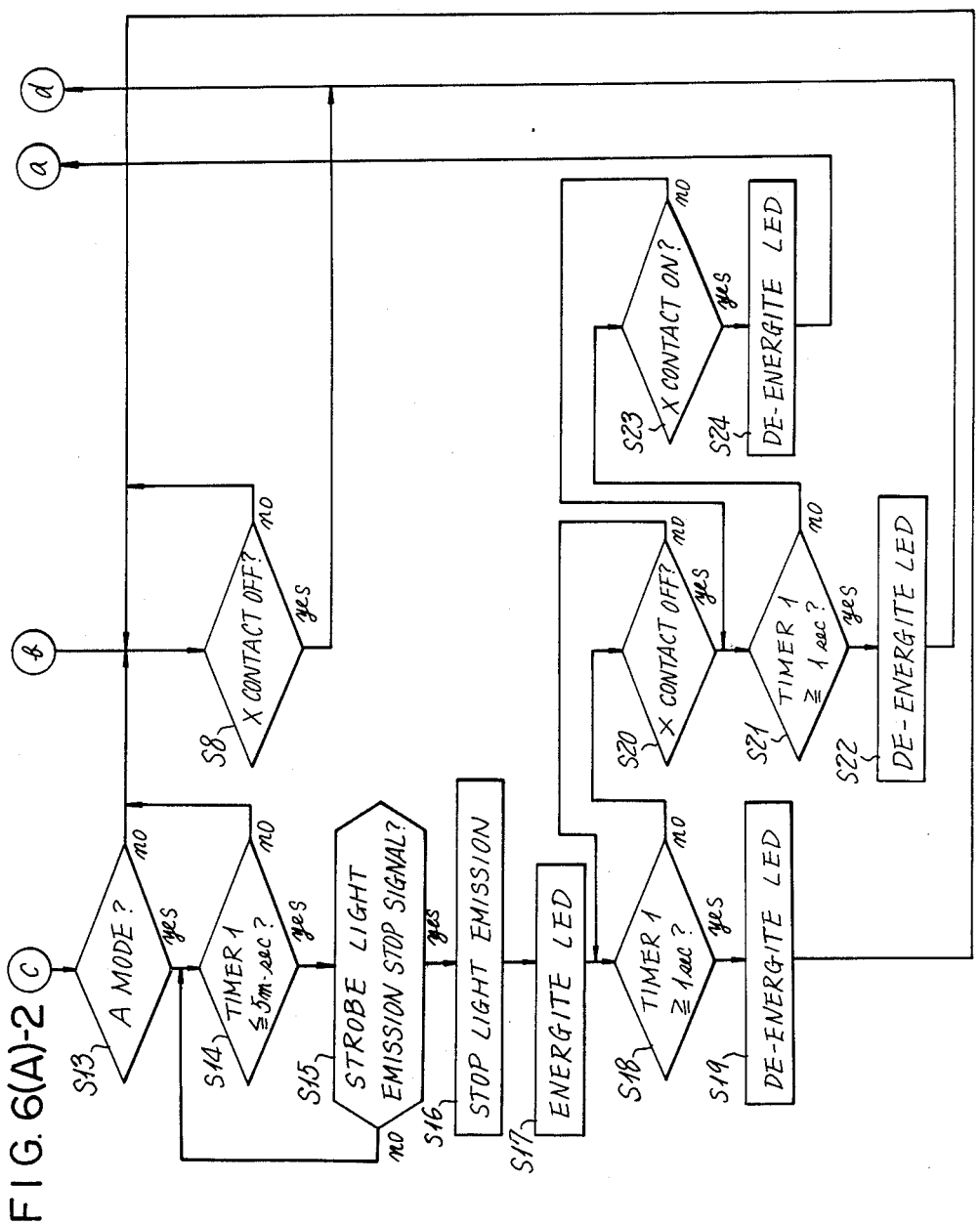

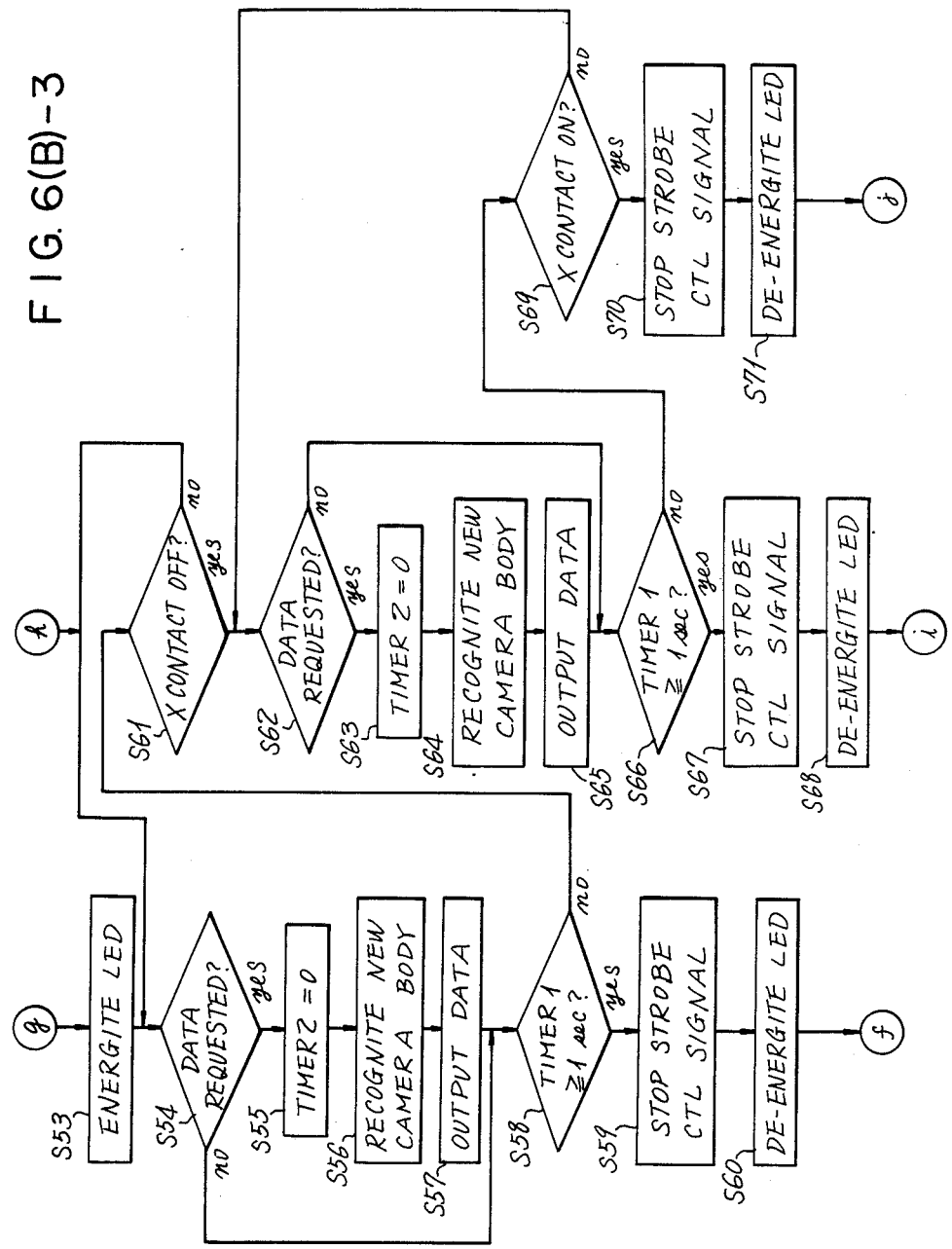

F I G. 7(b)
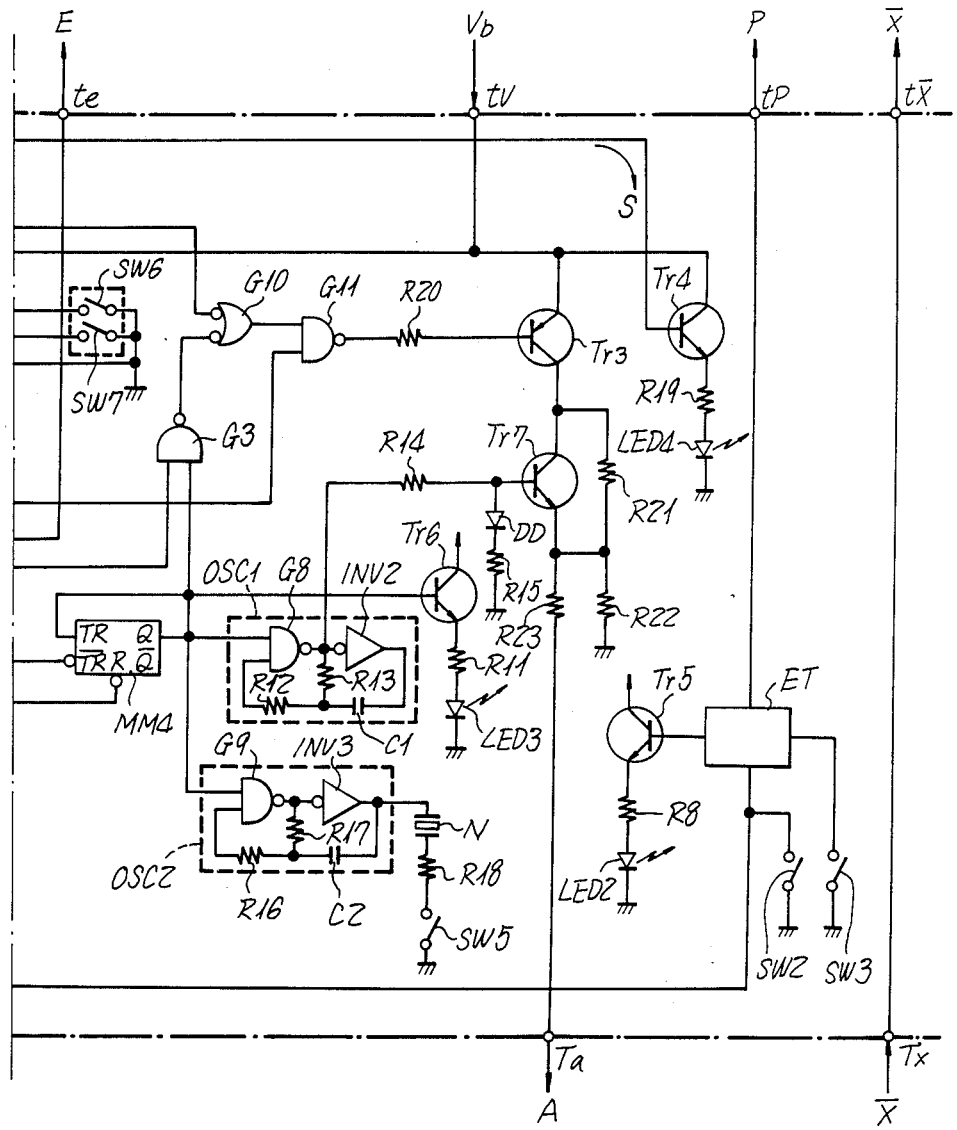

ELECTRONIC FLASH PHOTOGRAPHING SYSTEM

BACKGROUND OF THE INVENTION

1. Field of the invention:

The present invention relates to an electronic flash photographing system, and more particularly to an electronic flash photographing system in which many items of information can be transmitted between a camera and a flash lamp through a small number of signal transmission paths.

2. Description of the Prior Art:

Electronic flash devices (hereinafter referred to as "strobe") are roughly classified into built-in strobes integral with cameras and independent strobes separate from cameras. In general, more independent strobes are popular among users than built-in strobes since the built-in strobes tend to fail to produce a sufficient amount of light output and exhibit a disadvantage in sophisticated flash techniques such as bounce flash.

The independent strobe requires a wire or terminal for transmitting items of information between the strobe and the camera since the strobe and the camera are separate from each other. The wire or terminal used heretofore for such signal transmission between the strobe and the camera is known as a hot shoe (or direct shoe) or a synchro-cord. The hot shoe or the like transmits a light-emission signal or a light-emission stop signal from the camera to the strobe, and also transmits, from the strobe to the camera, a signal representative of the completion of charging of a main capacitor in the strobe or a signal indicating whether proper flash control has been effected in an automatic flash control strobe. In actual strobe photography, much more items of information are required to be transmitted between the camera and the strobe. For example, strobe control or automization can be rendered effective by transmitting information on a guide number setting and an automatic/manual mode setting, information on an F number setting, information indicating a general strobe or a dedicated strobe, information on a subject distance, a strobe light-emission start signal and a strobe light-emission stop signal, and other pieces of information.

To transmit the conventionally required pieces of information, three to four connecting terminals or wires are required, but cannot easily be connected by a hot-shoe connector arrangement. For the transmission of more items of information, the number of terminals needed to electrically connect the strobe and the camera is increased to the point where the connection can no longer be achieved by the hot-shoe connector. The strobe with a required connector arrangement for such information transmission would not be handled easily, and would not be compatible with different cameras, but would only be usable exclusively with the camera to which the strobe is connected.

Among the various information signals referred to above, the strobe light-emission stop signal from the camera is produced by a light control means mounted on a camera and composed of a light detector, an integrator, and other circuits. In particular, a direct photometric system in which strobe light falling upon a film surface through a photographic lens is measured by a light detector generates a light-emission stop signal having a higher light control accuracy than that of a light-emission stop signal produced by a light control means mounted on a strobe. The conventional electronic flash photographing system has an extra signal transmission terminal or a signal wire for transmitting the above light-emission stop signal generated in the camera to the strobe, imposing a limitation on the transmission of the other signals or resulting in the foregoing drawbacks.

It would be possible to manually switch between light control by the light control means on the strobe and light control by the light control means on the camera. However, such a manual switching attempt would be quite troublesome and invite an error or would not be reliable as the user might forget to effect the switching.

There are instances in which when a strobe is mounted on a camera and the camera is ready for strobe photography or in a strobe photographic mode, a subject to be photographed is bright enough not to require light emission from the strobe, or limit emission from the strobe is harmful as when taking a television image. In such instances, the camera or the strobe should be brought from the strobe photographic mode into a normal photographic mode in order to prevent improper exposure or undesirable consumption of a strobe power supply.

However, it would be difficult in certain situations for the user to determine whether the strobe is to be energized or not each time he is required to do so. If the user could make such a judgment, it would be time-consuming and tedious to change the photographic modes. Sometimes, a shutter chance would be lost, and the user would forget to change the modes, with the result that a photographing error would be caused.

Any photographing error due to the above causes may be prevented by a means for measuring the brightness of the subject prior to being photographed, determining whether strobe light should be emitted, and generating a lightemission inhibit signal when it is decided that no strobe light is to be given off. The light-emission inhibit signal is then delivered to the strobe to prevent the same from generating light output.

As described above, three to four connector terminals or wires have been required for transmitting the conventionally required items of information between the camera and the strobe. Adding another connector terminal for transmitting the light-emission inhibit signal from the camera to the strobe would increase the cost of the strobe. Furthermore, the hot-shoe connector is no longer used for making the necessary connection. The strobe connected somehow for such information transmission would not be handled easily, and would not be compatible with different cameras, but would only be usable exclusively with the camera to which the strobe is connected.

SUMMARY OF THE INVENTION

It is an object of the present invention to provide an electronic flash photographing system capable of transmitting many pieces of information between a camera and a flash tube through a small number of signal transmission paths without impairing the ease with which the camera can be coupled to the flash tube and the compatibility between the camera and the flash.

Another object of the present invention is to provide an electronic flash photographing system composed of a strobe having a light control means and a camera having a light control means, in which light-emission stop control of the strobe can be effected by the light control means on the camera without involving any human intervention such as human judgment and operation.

Still another object of the present invention is to provide an electronic flash photographing system capable of automatically inhibiting light emission from a strobe when a camera determines that no light is to be emitted from the strobe.

According to the present invention, an electronic flash photographing system comprises a camera, a flash unit separate from the camera, a first signal transmission path for transmitting a signal from the camera to the flash unit, and a second signal transmission path for transmitting a signal from the flash unit to the camera, the camera having means for generating and transmitting a timing clock signal to the first signal transmission path and for stopping generation of the timing clock signal or interrupting transmission of the timing clock signal to the first signal transmission path at least in photographing operation, and light control means for detecting and integrating flash light generated by the flash unit and reflected from a subject being photographed and for generating and transmitting a light-emission stop signal to the first signal transmission path when an integrated value of the detected flash light reaches a preset value, the flash unit having means for converting a plurality of information signals into a serial signal in synchronism with the timing clock signal from the first signal transmission path, the flash unit being responsive to the light-emission stop signal from the first signal transmission path for stopping light emission.

The above and other objects, features and advantages of the present invention will become more apparent from the following description when taken in conjunction with the accompanying drawings in which preferred embodiments of the present invention are shown by way of illustrative example.

BRIEF DESCRIPTION OF THE DRAWINGS

FIG. 1 shows in block form the manner in which signals are transmitted between a strobe assembly and a camera according to the present invention.

A strobe assembly OS and a camera CA are interconnected by a hot shoe which is an accessory shoe for the camera or a synchro-cord. From the camera CA to the strobe assembly OS, there are transmitted a first signal B as a timing clock signal generated in the camera CA and an X contact output signal $\bar{x}$ as a light-emission start signal for starting generation of flash light. From the strobe assembly OS to the camera CA, there is transmitted a second signal A as many serial information signals.

The strobe assembly OS comprises a light-emitting unit F1 for emitting strobe light, and a strobe control unit F2 for controlling signals transmitted between the light-emitting unit F1 and the camera CA. From the light-emitting unit F1 to the strobe control unit F2, there are applied an X contact responsive signal generated by the light-emitting unit F1 in response to the X contact output signal $\bar{x}$ from the camera CA, a strobe charging completion signal S indicative of whether a main capacitor in the strobe has been charged up to a voltage capable of emitting light, and a power supply voltage Vb from a power supply (not shown) contained in the light-emitting unit F1. From the strobe control unit F2 to the light-emitting unit F1, there are applied an effective stop signal E to stop light emission from the strobe, a power supply control signal P to control the power supply in the light-emitting unit F1, and the X contact output signal $\bar{x}$.

Figures 1, 6A:
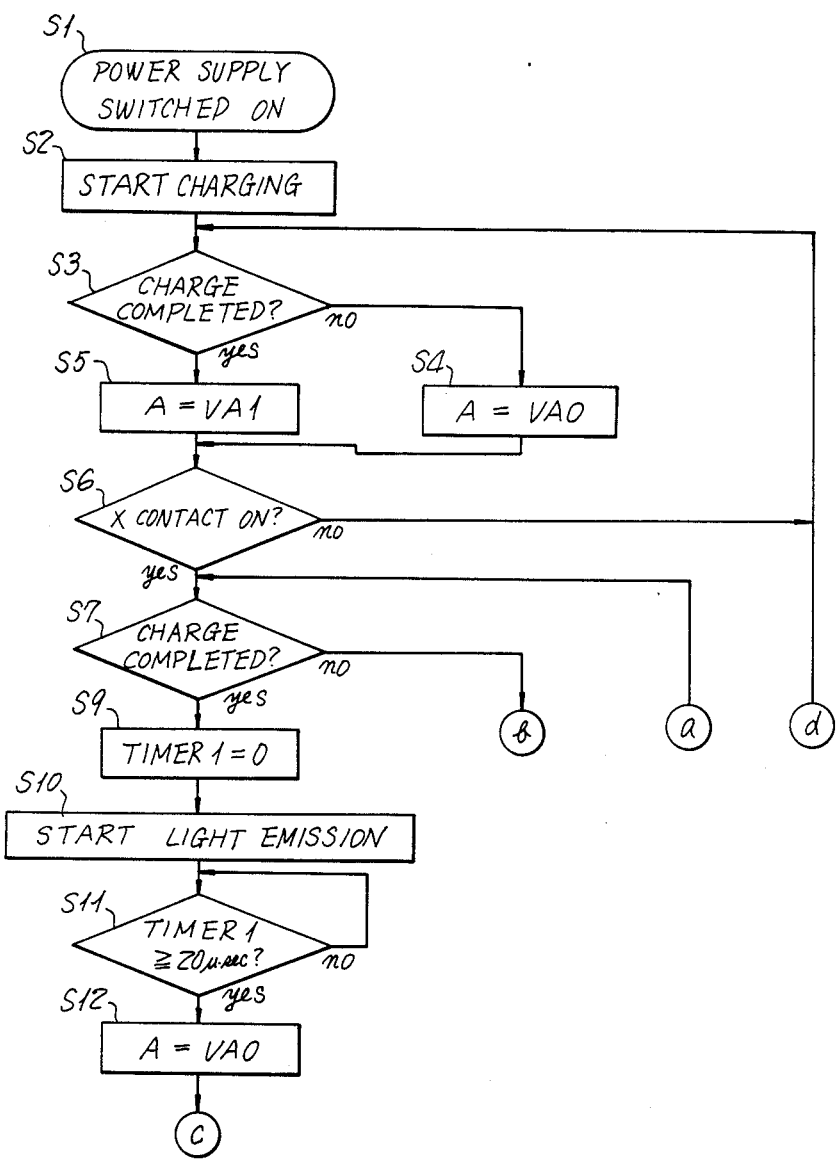
FIGS. 6A and 6B are flowcharts of operation of the electronic flash photographing system of the invention.
Figures 1, 6B:
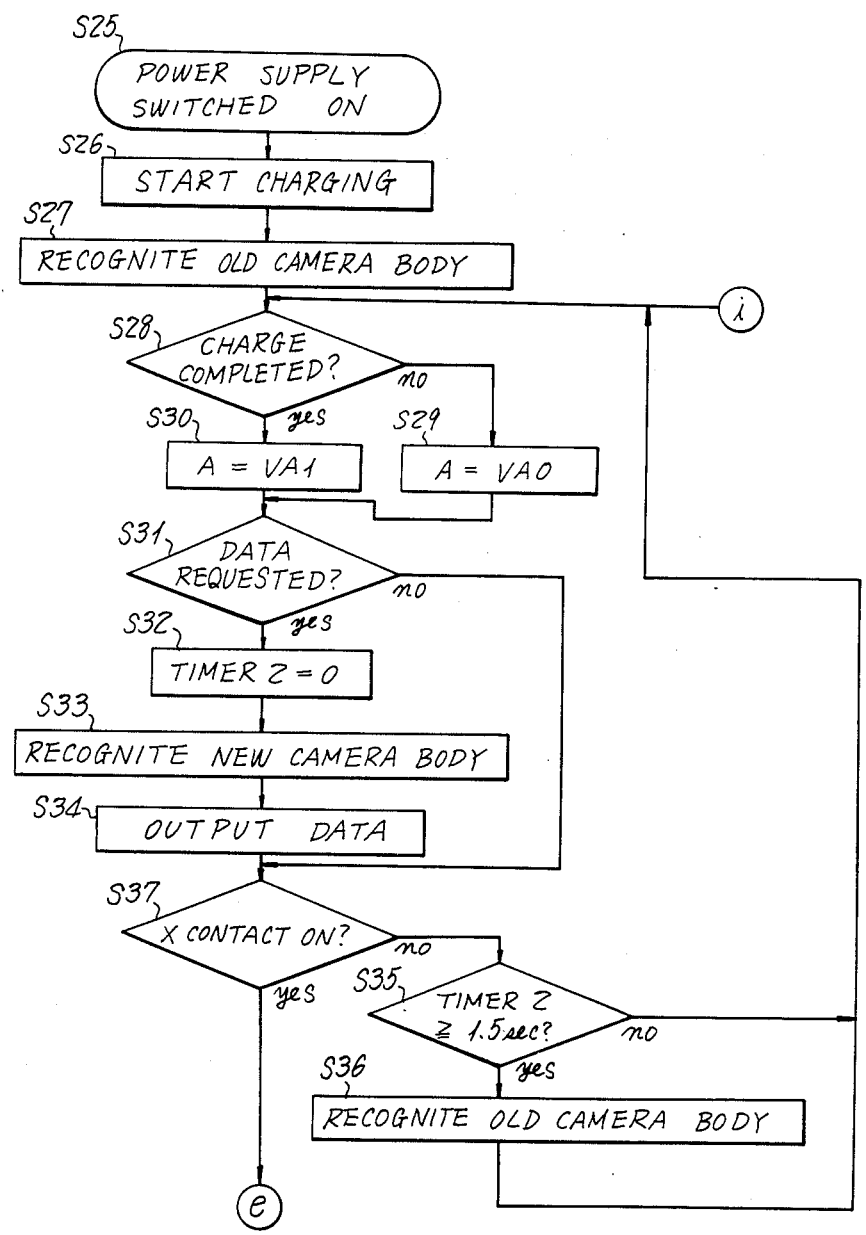
Figures 2, 6B:
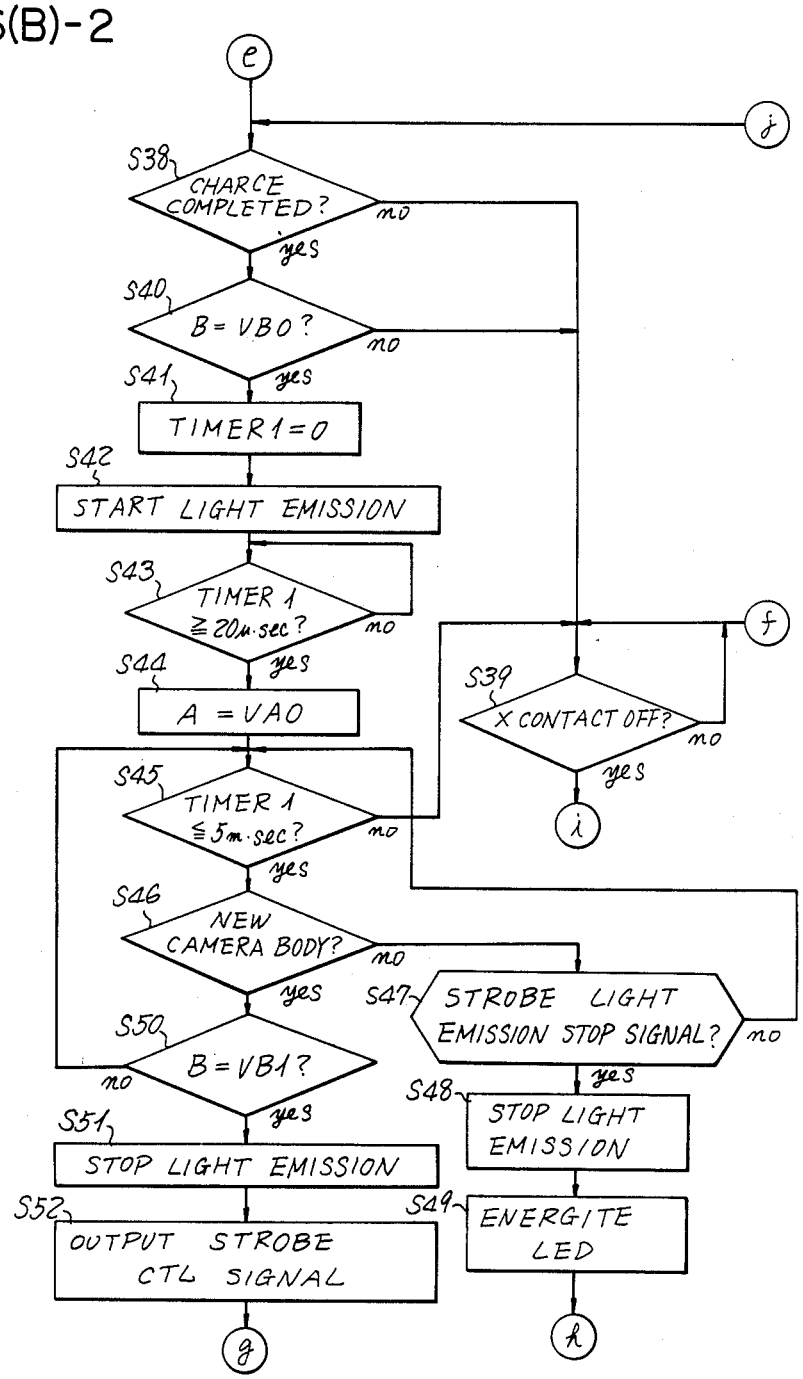

FIG. 2 shows a circuit arrangement of the strobe control unit F2 according to an embodiment of the present invention.

Figure 1:
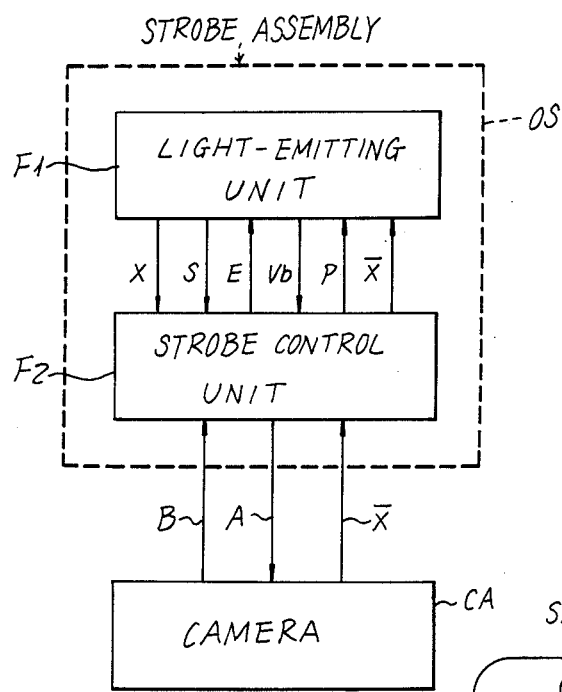
FIG. 1 is a block diagram of a strobe assembly and a camera, showing the manner in which signals are transmitted between the strobe assembly and the camera.

The strobe control unit F2 has a clock signal terminal Tb receptive of the first signal B or timing clock signal generated in the camera body CA (FIG. 1). The clock signal terminal Tb is connected through a resistor R1 to the base of a transistor Tr1 in the strobe control unit F2 and also through a resistor F2 to ground. The transistor Tr1 has a collector connected through a resistor R3 to a terminal tv supplied with the power supply voltage Vb from the light-emitting unit F1, that is, to a power supply line 1, the transistor Tr1 having an emitter directly grounded. A transistor Tr2 has a collector connected to the power supply line 1 and an emitter connected to ground through a resistor R7 and a light-emitting element or diode LED1 connected in series therewith for discriminating new and old camera bodies. A non-retriggerable monostable multivibrator MM1 produces an output pulse signal for 500 μsec. in the illustrated embodiment upon being triggered. The monostable multivibrator MM1 has an input terminal TR connected to the collector of the transistor Tr1 and an output terminal Q connected to another input terminal TR thereof and to input terminals of NAND gates G1, G2. The NAND gate G1 has another input terminal connected to the power supply line 1 through a resistor R4 and to a mode changeover switch SW1 so that the input terminal of the NAND gate G1 will be grounded when the switch SW is closed. The mode changeover switch SW1 will be closed by being externally acted upon when in a manual mode or manually operating the light-emitting unit F1 (by manually setting an F number based on the parameters of a guide number, an object distance, and a lens F number) for manual photographic operation, and when light emission from the strobe is stopped with priority by a strobe control circuit SC contained in the strobe assembly OS for automatic light-controlled photography. The mode changeover switch SW1 will be opened when in an R mode or receiving with priority a light-emission stop signal from the camera CA to stop light emission from the light-emitting unit F1 and transmitting many information signals between the camera CA and the strobe assembly OS. The NAND gate G1 has an output terminal connected to a preset input terminal R/$\overline{S}$ of a shift register SR serving as a parallel-to-serial converter means and also to an input terminal $\overline{TR}$ of a retriggerable monostable multivibrator MM2. The retriggerable monostable multivibrator MM2 produces a H-level (high level) output pulse signal from an output terminal Q and a L-level (low level) output pulse signal from an output terminal $\overline{Q}$ for 1.5 sec. in the illustrated embodiment each time a L-level trigger pulse is received by the input terminal TR. The output terminal Q of the retriggerable monostable multivibrator MM2 is connected to the base of the transistor Tr2 via a resistor R9, to the other input terminal of the NAND gate G2, and an input terminal of a NAND gate G3. The other output terminal $\overline{Q}$ of the monostable multivibrator MM2 is connected to an input terminal of a NAND gate G4 having another input terminal connected to an output terminal of the strobe control circuit SC contained in the strobe assembly OS and serving as a light control means. Although no specific structural details are omitted, the strobe control circuit SC receives light reflected from a subject being photographed with a light detector PS in the strobe assembly OS and issues a light-emission stop signal when the amount of received light reaches a preset value in an integrator circuit, thereby energizing a light-emission stop circuit in the light-emitting unit F1 to interrupt light emission from a discharge tube for automatic control of light emission. The NAND gates G2, G4 have output terminals coupled to input terminals of a NAND gate G5 with its output terminal connected to an input terminal of a NAND gate G6. The other input terminal of the NAND gate G6 is connected to the power supply line 1 via a resistor R10 and to an automatic/manual selector switch SW4, so that the other input terminal of the NAND gate G6 is grounded when the switch SW4 is closed. The NAND gate G6 has an output terminal connected to an input terminal of a NAND gate G7 through an inverter INV1 and to a terminal te which transmits the effective stop signal E from the strobe control unit F to the light-emitting unit F1. The effective stop signal E allows or inhibits strobe light emission from the light-emitting unit F1. In the illustrated embodiment, when an X (synchro) contact in the camera CA is closed with the effective stop signal E being of an L level, no light is emitted from the light-emitting unit F1. A terminal tx receptive of the X contact responsive signal X from the light-emitting unit F1 is connected to an input terminal TR of a non-retriggerable monostable multivibrator MM3 and also to a reset terminal R of another non-retriggerable monostable multivibrator MM4. The non-retriggerable monostable multivibrator MM3 produces a pulse having a time duration of 5 m sec. when an H-level trigger pulse is applied to the trigger terminal TR. One input terminal Q of the monostable multivibrator MM3 is coupled to the other input terminal of the NAND gate G7 and the other output terminal $\overline{Q}$ thereof is connected to the other input terminal $\overline{TR}$. The NAND gate G7 has an output terminal connected to an input terminal $\overline{TR}$ of the non-retriggerable monostable multivibrator MM4. The non-retriggerable monostable multivibrator MM4 according to the illustrated embodiment produces a pulse having a duration of 1 sec. and has an output terminal Q connected to an input terminal TR thereof, an input terminal of the NAND gate G3, an input terminal of a NAND gate G8, an input terminal of a NAND gate G9, and the base of a transistor Tr6. The transistor Tr6 has a collector coupled to the power supply line and an emitter to ground via a resistor R11 and a light-emitting element LED3 for allowing the user to confirm light control. Between the output terminal and other input terminal of the NAND gate G8, there are connected an inverter INV2, a capacitor C1, and a resistor R12. A resistor R13 is connected between the output terminal of the NAND gate G8 and a junction between the capacitor C1 and the resistor R12. The NAND gate G8, the inverter INV2, the resistors R12, R13, and the capacitor C1 jointly constitute an oscillator OSC1 for producing an output signal oscillating at 4 Hz, as indicated by the dotted line. Another oscillator OSC2 for producing an output signal oscillating at 4 Hz is composed of a NAND gate G9, an inverter INV3, a capacitor C2, and resistors R16, R17. The oscillator OSC1 has an output terminal, or the output terminal of the NAND gate G8, connected via a resistor R14 to the base of a transistor Tr7, which is grounded via a forward-biased diode DD and a resistor R15 connected series therewith. The oscillator OSC2 has an output terminal, or the output terminal of the inverter INV3, connected to a terminal of a sound-producing body N such as a piezoelectric sound-producing body or a loudspeaker, which has another terminal grounded through a resistor R18 and a switch SW5. The switch SW5 will be opened when the sound-producing body N should not be energized.

A transistor Tr4 has a base connected to a terminal ts receptive of the strobe charging completion signal S from the light-emitting unit F1, a collector coupled to the power supply line 1, and an emitter connected by a resistor R19 to the anode of a light-emitting element LED4 which indicates the completion of strobe charging, with the cathode thereof being grounded. The terminal ts is also connected via an inverter INV4 to an input terminal of a NAND gate G10 having another input terminal connected to the output terminal of the NAND gate G3 and an output terminal connected to an input terminal of a NAND gate G11.

The shift register SR has a clock pulse input terminal CK connected to the collector of the transistor Tr1 and four parallel input terminals P4–P7. The input terminals P4, P5 connected respectively through resistors R5, R6 to the power supply line and to terminals of F-number setting switches SW6, SW7 used for a program mode. When the switches SW6, SW7 are turned on the input terminals P4, P5 are grounded. The input terminal P6 is directly grounded, while the input terminal P7 is connected to the terminal ts. The input terminals P4, P5 are supplied with input signals D3, D2 serving as F-number setting signals. The input terminal P6 is supplied with an input signal D1 serving as a signal for discriminating new and old strobes (the new strobe means a strobe according to the present invention, while the old strobe means a conventional strobe). The input terminal P7 is supplied with an input signal D0 serving as a strobe charging completion signal. The shift register SR also has a terminal P8 connected to the power supply line 1, and an output terminal Q8 connected to the other input terminal of the NAND gate G11. The NAND gate G11 has an output terminal connected via a register R20 to the base of a PNP transistor Tr3 having an emitter coupled to the power supply line 1 and a collector connected to the collector of the transistor Tr7. The transistor Tr7 is shunted by a resistor R21 connected between the collector and emitter thereof, and has an emitter connected to ground by a resistor R22 and to a terminal Ta for connection to the camera CA via a resistor R23. The second signal A is transmitted via the terminal Ta to the camera CA. A terminal Tx is receptive of a light-emission signal x̄ for starting flash light, generated from a synchro terminal in the camera CA, and a terminal tx transmits the light-emission signal x̄ from the strobe control unit F2 to the light-emitting unit F1.

A power supply timer ET has a timer starting terminal connected to the collector of the transistor Tr1 and grounded via a timer switch SW2. The power supply timer ET has a ground terminal coupled to ground via a main switch SW3. The power supply timer ET has one output terminal or a terminal for issuing a power supply control signal for switching on and off the power supply contained in the light-emitting unit F1, the output terminal being connected to a terminal tp, and another output terminal connected to the base of a transistor Tr5. The transistor Tr5 has a collector connected to the power supply line 1 and an emitter grounded by a series-connected circuit composed of a resistor R8 and a light-emitting element LED2 for indicating power supply timer operation.

A path for transmitting the timing clock signal or first signal B from the camera CA to the strobe assembly OS, that is, a circuit composed of a path from a means (shown in FIG. 3 and described in detail later on) for generating the timing clock signal in the camera CA to the shift register SR, is termed a first signal transmission path. A path for transmitting a plurality of information signals as the second signal A from the strobe assembly OS to the camera CA, that is, a circuit composed of a path from the shift register SR to a timing control circuit (described later) in the camera body CA or a light-emitting element and a discriminator means, not shown, (a serial signal discriminator means composed as of a series-to-parallel converter circuit, a latch circuit, and a decoder), is termed a second signal transmission path.

Figure 3:
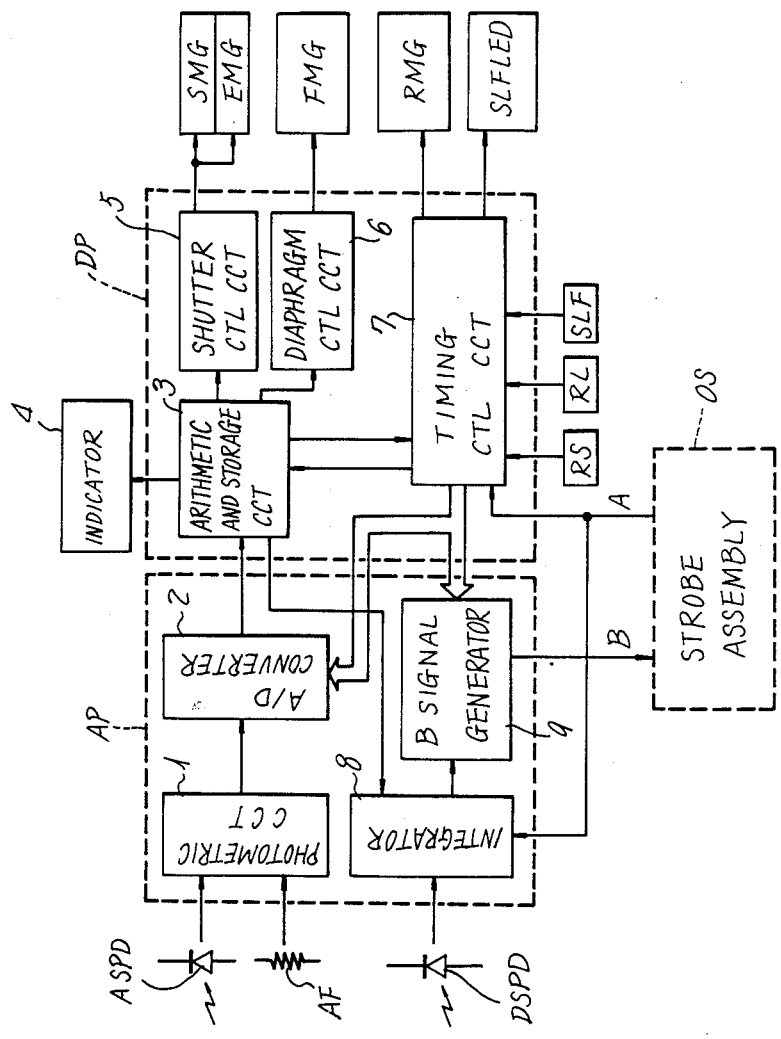
FIG. 3 is a block diagram of a circuit arrangement of a camera, suitable for use with a strobe assembly according to the present invention.

FIG. 3 is a block diagram of the camera CA.

Information processing in the camera CA is effected in an analog processor AP and a digital processor DP. The analog processor AP includes a first light detector ASPD for measuring light reflected from the subject while a shutter release button is half depressed, a photometric circuit 1 for processing the measured light with the aid of preset ASA diaphragm (or shutter) information AF, and an A/D converter 2 for converting the processed signal into a digital quantity. The digital signal is then applied to an arithmetic and storage circuit 3 in the digital processor DP. The arithmetic and storage circuit 3 indicates photometric information obtained by the first light detector ASPD on an indicator 4 in a camera viewfinder and simultaneously operates a shutter control circuit 5. The shutter control circuit 5 is responsive to a command from the arithmetic and storage circuit 3 for actuating a front blind magnetic SMG and a rear blind magnet EMG of a shutter. For shutter priority, a diaphragm control circuit 6 is operated for actuating a diaphragm magnetic FMG to control a diaphragm ring. The arithmetic and storage circuit 3 is responsive to a signal from a timing control circuit 7 in the digital processor DP for changing a preset value to be compared with an integrated value from an integrator 8 in the analog processor AP. The integrator 8 starts integrating light reflected from the subjected and detected by a second light detector DSPD arranged to detect reflected light onto a film surface, from the time the integrator 8 is supplied with the light-emission start signal as the A signal from the strobe assembly OS. When the integrated signal reaches a preset value of the arithmetic and storage circuit 3, the integrator 8 issues a light-emission stop signal through a B signal generator 9 to the strobe assembly OS for thereby stopping light emission. The light detector DSPD and the integrator 8 in the camera CA will be referred to as a first light control means. The B signal generator 9 supplies the strobe assembly OS with the timing clock signal as the B signal under a command from the timing control circuit 7 when the shutter release button is half depressed and a power supply turn-on signal PS is applied to the timing control circuit 7. At this time, if it is determined that strobe light emission is not required or will cause overexposure as a result of an arithmetic operation effected by the arithmetic and storage circuit 3 on light detected by the first light detector ASPD, then the timing control circuit 7 applies a command to the B signal generator 9 to enable the latter to produce a light-emission inhibit signal equivalent to the light-emission stop signal. A circuit portion for generating the light-emission inhibit signal will be referred to as a light-emission inhibit generating means. When the shutter release button is fully depressed and a shutter release signal RL is applied to the timing control circuit 7, the timing control circuit 7 issues a command to interrupt the issuance of the timing clock signal. At the time of light control, that is, when the integrated value in the integrator 8 reaches the preset value, the timing control circuit 7 generates the light-emission stop signal. The light-emission inhibit signal from the light-emission inhibit signal generating means still continues to be generated at least from a time immediately before the X contact producing the light-emission start signal is turned on to a time immediately after the X contact is turned off. The timing control circuit 7 is also responsive to a self-timer signal SLF for controlling light emission from a timer indicator element SLFLED and controlling operation of a release magnet RMG which drives a mirror or the like.

Figure 4:
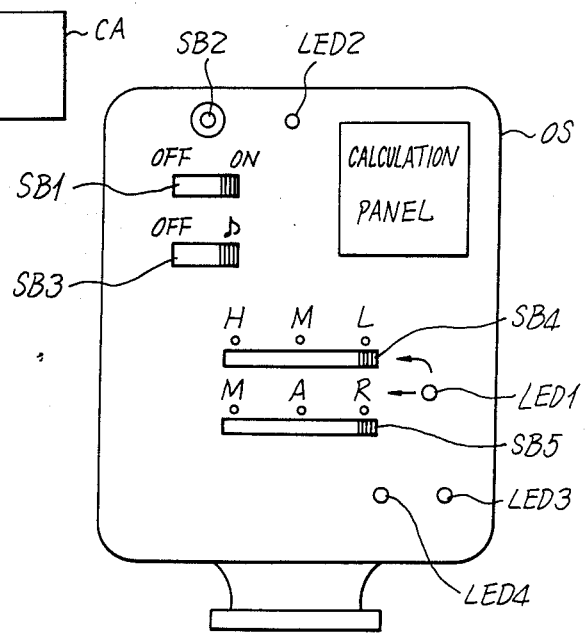
FIG. 4 is a rear elevational view of the strobe assembly of the invention, on which switch buttons, light-emitting elements, and other components are mounted.
Figure 2A:
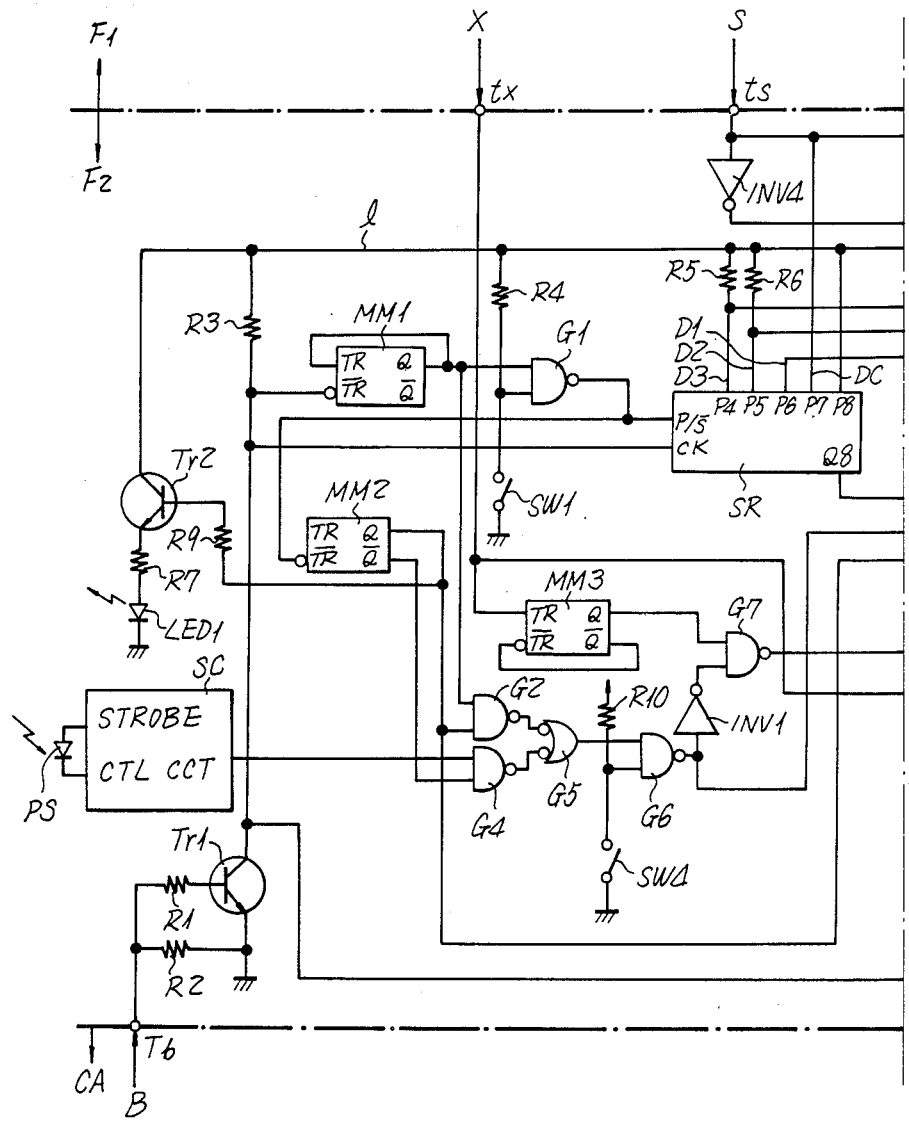
FIG. 2 is a circuit diagram of a circuit arrangement of an electronic flash photographing system according to an embodiment of the present invention.
Figure 2B:
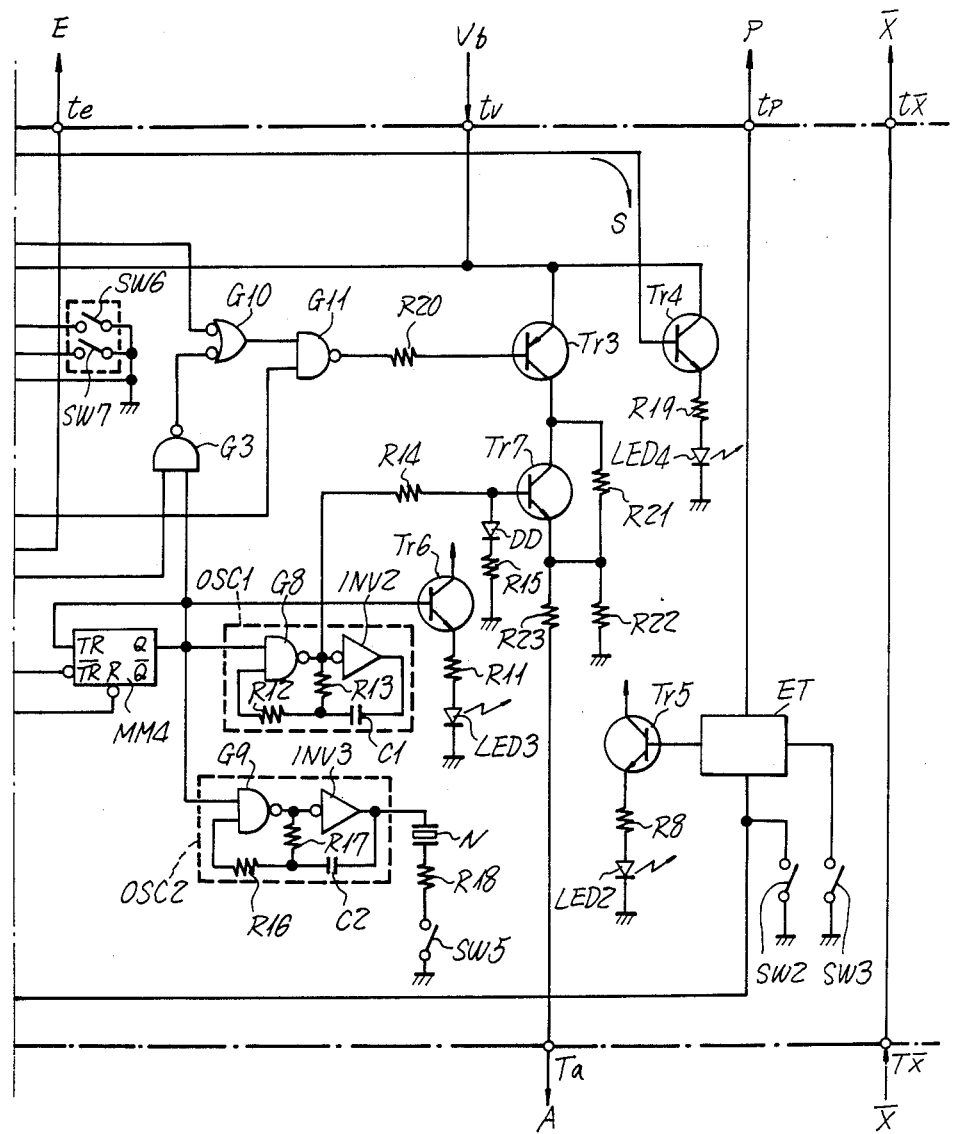

FIG. 4 shows a rear housing wall of the strobe assembly OS.

The rear housing wall of the strobe assembly OS supports thereon a switch button SB1 for turning on and off the main switch SW3, a switch button SB2 for turning on and off the timer switch SW2, a switch button SB3 for turning off the switch SW5 when the sound-producing body N is not to be actuated, and a switch button SB4 for setting an F number for the program mode. When the switch button SB4 is set to an "H" position (corresponding to F8), both of the switches SW6, SW7 are turned on. When the switch button SB4 is set to an "M" position (corresponding to F5.6), both of the switches SW6, SW7 are turned off. When the switch button SB4 is set to an "L" position (corresponding to F4), the switch SW6 is turned on and the switch SW7 is turned off. The rear housing wall of the strobe assembly OS also supports a mode selector button SB5. When the mode selector button SB5 selects an "M (manual) mode", the switches SW1, SW4 are turned on. When the mode selector button SB5 selects an "A (auto) mode", the switch SW1 is turned on while the switch SW4 is turned off. When the mode selector button SB5 selects an "R mode" for achieving mutual control of the strobe of the invention and the camera matching the strobe, both the switches SW1, SW4 are turned off. Designated at LED1 through LED4 are light-emitting elements which are denoted by the same reference characters in FIG. 2.

Operation of the electronic flash photographing system thus constructed will be described with reference to the timing charts of output signals shown in FIGS. 5A through 5D.

(1) Where an old camera body is mounted and the "M mode" is selected:

When the foot of the strobe assembly CA is mounted on a hot-shoe type accessory shoe, for example, of a conventional camera (hereinafter referred to as an "old body"), at least a synchro terminal of the old body and the terminal $\overline{Tx}$ of the strobe control unit F2 are interconnected. When the mode selector button SB3 selects "M", the switch SW1 is turned on and the switch SW4 is turned on. By sliding the main switch button SB1 from the off position to the on position and depressing the timer switch button SB2, the main switch SW3 and the timer switch SW2 are turned on to energize the power supply timer ET for applying a power supply control signal P from its output terminal via the terminal tp to cause the non-illustrated power supply in the light-emitting unit F1 to apply a power supply voltage to the circuits in the light-emitting unit F1 (such as a DC/DC converter, a main capacitor charging circuit, a trigger circuit, and the like), and a power supply voltage Vb is applied via the terminal tv to the power supply line l. As the power supply timer ET is started, the transistor Tr5 is simultaneously rendered conductive to energize the light-emitting element LED2 which indicates timer operation to show that the power supply voltage is applied to the various circuits.

The switch button SB4 for turning on and off the F-number setting switches SW6, SW7 is effective only in the the switch button SB4 may be in any position.

When the various circuits are supplied with the power supply voltage by the power supply control signal P, the main capacitor (not shown) in the light-emitting unit F1 starts being charged. While the charged voltage across the main capacitor is lower than a prescribed voltage, the strobe charging completion signal S is at the L level, and the transistor Tr4 with its base supplied with the L-level strobe charging completion signal S via the terminal ts is kept de-energized. Therefore, the light-emitting element LED4 for indicating the completion of strobe charging is not energized. When the main capacitor is charged up to the prescribed level, the strobe charging completion signal S goes high to energize the transistor Tr4 for thereby energizing the light-emitting device LED4. Therefore, the user now knows that the strobe is capable of emitting light.

Figure 5A:
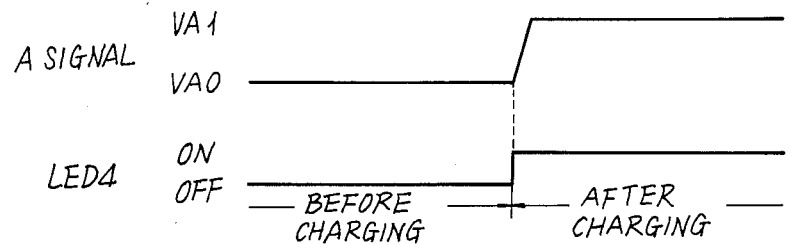
FIGS. 5A through 5D are timing charts of output signals produced in the circuit arrangement illustrated in FIG. 2.
Figure 5C:
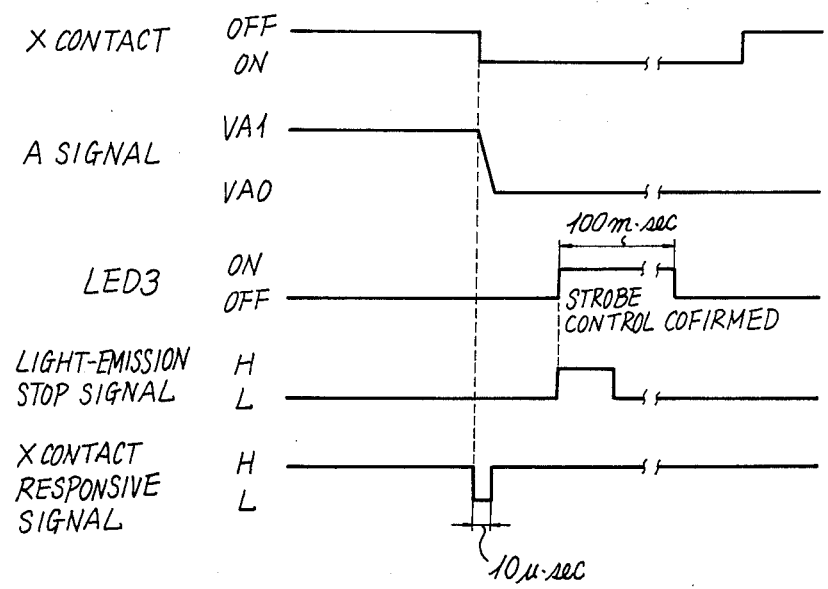
Figure 5B:
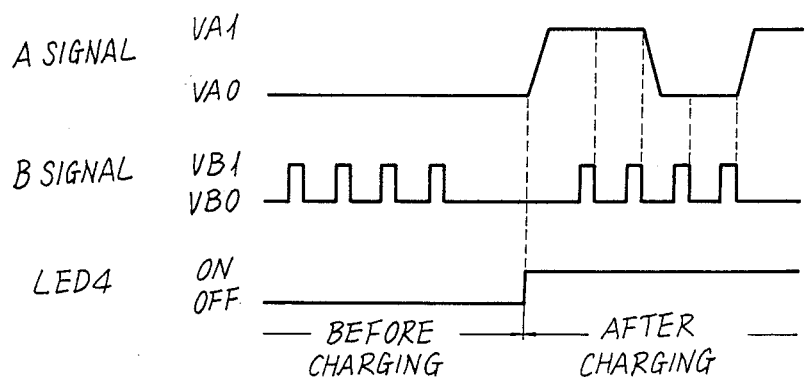

When the timer switch SW2 is turned on and then turned off again, the clock pulse input terminal CK of the shift register SR and the input terminal $\overline{TR}$ of the monostable multivibrator MM1 are supplied with a signal of an L level. However, since the mode changeover switch SW1 is tuned on, the preset input terminal P/$\overline{S}$ is supplied with a signal of an H level only. The shift register SR does not shift parallel input signals, but issues out a signal of the input terminal P7 at the first stage (LSB), that is, the H-level strobe charging completion signal S, from the output terminal Q8, the signal being applied to one of the input terminals of the NAND gate G11. Inasmuch as the other input terminal of the NAND gate G11 is supplied with the H signal from the NAND gate G10, the output of the NAND gate G11 goes low to energize the transistor Tr3. Since the transistor Tr7 connected in series with the transistor Tr3 has been energized with its base supplied with an H signal from the oscillator OSC1 which has stopped its oscillating operation, the terminal Ta issues the second signal A having a voltage VA1 from the time of the charging completion, as shown in FIG. 5A. Therefore, as long as the old body has a terminal receptive of a charging completion signal, the user can recognize the charging completion through the camera based on the second signal A.

In the "M mode", the strobe is not subjected to light control and the automatic/manual selector switch SW4 is turned on. Therefore, the function of confirming strobe light control is not activated, and hence the light-emitting element LED3 and the sound-producing body N for indicating light control confirmation are not energized.

(2) Where an old body is mounted and "A mode" is selected:

In this mode, the system operates substantially in the same manner as the above mode (1). Since the automatic/manual selector switch SW4 is turned off by selecting "A mode" with the mode selector button SB5 (FIG. 4), however, the functions of light control and light control confirmation are activated. The light control and light control confirmation will be described with reference to FIG. 2 and FIG. 5C. With the strobe main capacitor charged up to the prescribed level, the light-emission signal from the camera CA (which is generated as by closing the X contact) is supplied through the strobe control unit F2 to the light-emitting unit F1 to emit strobe light. Simultaneously with the strobe light emission, the X contact responsive signal X is supplied from the light-emitting unit F1 through the terminal tx to the strobe control unit F2 for a short period of time such as 10 μsec. This signal is applied to the input terminal TR of the monostable multivibrator MM3 and the reset terminal R of the monostable multivibrator MM4. The monostable multivibrator MM3 applies an H signal to one of the input terminals of the NAND gate G7 for 5 m sec. As light is emitted from the strobe, light (including natural light) reflected by the subject is detected by the light detector PS in the strobe assembly F2. When the amount of detected light has achieved the preset value of the integrator in the strobe control circuit SC, the light-emission stop signal is applied to the light-emitting stop circuit in the light-emitting unit F1, whereupon the light emission from the strobe (discharge tube) is interrupted for automatic control of strobe light emission. More specifically, the strobe control circuit SC applies the light-emission stop signal (H signal) to one of the input terminals of the NAND gate G4. As the other input terminal of the NAND gate G4 is also high, the NAND gate G4 issues an L signal. The NAND gate G2 issues an H signal since its two input terminals are low. With the H and L signals applied from the NAND gates G2, G4, the NAND gate G5 applies an H signal to the NAND gate G6 which then produces an L output signal. The L signal from the NAND gate G6 is applied as the light-emission stop signal via the terminal te to the light-emitting unit F1. The light-emission stop signal applied to the light-emitting unit F1 is inverted into an H signal as by an inverter (not shown), which is applied to the light-emission stop circuit, which immediately interrupt light emission. The L output signal from the NAND gate G6 is inverted by the inverter INV1 into an H signal, which is applied to one of the input terminals of the NAND gate G7. If the time when the H signal is applied to the other input terminal of the NAND gate G7, i.e., when the light-emission stop signal is generated, falls within 5 m sec. from the time when the strobe starts emitting light (within the time in which a pulse is generated by the monostable multivibrator MM3), then an L signal is issued by the NAND gate G7 to oscillate the oscillators OSC1, OSC2 for 1 sec. and to render the transistor Tr6 conductive for energizing the light-emitting element LED3 (for 1 sec.) to allow the user to confirm that light from the strobe is controlled properly. The oscillation (at 4 Hz) of the oscillator OSC1 causes the transistor Tr7 to be alternately energized and de-energized repeatedly at a prescribed period. Since the transistor Tr3 has been de-energized as the charging complesion signal S is at an L level, the second signal A issued from the terminal Ta is of a voltage VA0 (VA1>VA0). The oscillator OSC2 is also alternately energized and de-energized at a prescribed period (4 KHz) for 1 sec. to drive the sound-producing body N, the user can also confirm the light control with sounds. If the sounds are not desirable for some reasons, then the switch SW5 may be turned off. No light-emission stop signal from the strobe control circuit SC within 5 m sec. after the strobe light emission means that the amount of light emitted from the strobe does not reach an adequate amount of light. Therefore, if the time when the light-emission stop signal generated by the strobe control circuit SC is supplied as an H signal to the NAND gate G7 via the NAND gates G4, G5, G6 and the inverter INV1 exceeds the period of time (5 m sec.) during which the H signal from the monostable multivibrator MM3 upon strobe light emission is supplied to the NAND gate G7, then the input signal applied to the monostable multivibrator MM4 goes high to cause the output terminal Q thereof to produce an L output signal. Thus, the light-emitting element LED and the sound-producing body N are not energized, so that the user can recognize that the strobe has not been subjected to light control and hence the subject has been photographed with an underexposure.

While the foregoing operation is effected with "A mode" selected, substantially the same operation as above will be carried out if the strobe assembly is mounted on an old body and "R mode" is selected.

(3) Where a new body is mounted and "R mode" is selected:

When the camera CA is of a new body, the first signal B of voltages VB1, VB0 is applied at a prescribed interval (1 μsec. at minimum) from the camera CA to the connector terminal Tb. Therefore, the transistor Tr1 supplied with the first signal B at its base is alternately energized and de-energized repeatedly. When the transistor Tr1 is turned on, the collector potential is lowered to apply an L signal to the input terminal $\overline{TR}$ of the monostable multivibrator MM1 and the clock pulse input terminal CK of the shift register SR. The output terminal Q of the monostable multivibrator MM1 then issues an H output signal to the NAND gate G1 to apply an L signal to the preset input terminal $\overline{P/s}$ of the shift register SR for a fixed period of time (500 μsec.). The shift register SR is then placed into a serial mode in which parallel input signals can be shifted. When a signal which turns from L to H (a clock pulse) is applied to the clock pulse input terminal CK during this mode, the shift register SR first shifts an H-level strobe charging completion signal D0, for example, applied to the parallel input terminal P7 and issues the shifted signal out of the output terminal Q8. When a next clock pulse is applied to the input terminal CK, an L-level new/old strobe discriminating signal D1 (the L level indicates a new strobe) is issued out of the output terminal Q8. Likewise, F-number setting signals D2, D3 (in FIG. 2, D2=H, D3=H, indicating F=5.6) are successively delivered out of the output terminal Q8 to one of the input terminals of the NAND gate G11. Since the other input terminal of the NAND gate G11 is supplied with the H input signal from the NAND gate G10, the output terminal of the NAND gate G11 issues an encoded signal corresponding to a serial signal (L or H signal) from the output terminal Q8 of the shift register SR to energize and de-energize the transistor Tr3. As the transistor Tr7 connected in series with the transistor Tr3 has been energized, the serial signal becomes the second signal A issued out through the terminal Ta. Although not shown, the encoded serial signal in the camera CA is applied to a discriminator means and converted by a series-to-parallel converting circuit back into a parallel signal, which is latched and decoded by a decoder for effecting indications and control. For example, the F-number setting signals D2, D3 are decoded to change a program diagram corresponding to the F number at the time of program exposure control.

The functions of light control and light control confirmation will be described. It is assumed that a light-emission signal $\bar{x}$ has been applied to the light-emitting unit F1 to emit strobe light and that an X contact responsive signal X has been applied from the light-emitting unit F1 to the monostable multivibrators MM3, MM4. The camera CA which is of a new body has a light control means (corresponding to the second light detector DSPD and the integrator 8 shown in FIG. 3) for detecting strobe light reflected onto the film surface when the subject is photographed and issuing a light-emission stop signal to the strobe assembly OS. Now, the light control means in the camera CA will be referred to as a first light control means, the light detector PS and the strobe control circuit SC in the strobe assembly OS as a second light control means, and light-emission stop signals generated by the first and second light control means as first and second light-emission stop signals, respectively.

Figure 5D:
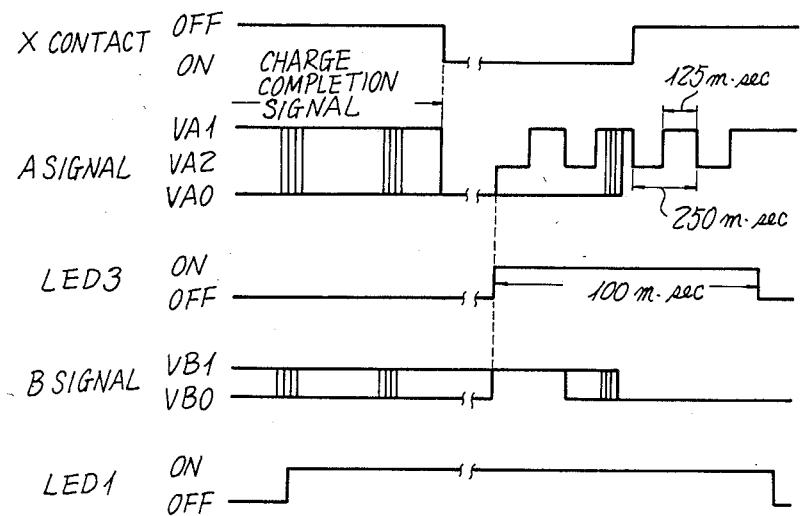

As strobe light emission is started, the first and second light control means begin integrating strobe light. When the amounts of light detected by the first and second light control means reach preset values of integrators, the first light control means applies a first light-emission stop signal (B signal) of an H level, as shown in FIG. 5D, from the camera body CA through the terminal Tb to the base of the transistor Tr1. The second light control means applies a second light-emission stop signal of an H level to one of the input terminals of the NAND gate G4 in the strobe control unit F2. At this time, the transistor Tr1 is energized to render the output signal from the monostable multivibrator MM1 high for a short period of time (500 μsec.). Since the monostable multivibrator MM2 is retriggerable and has a long pulse duration of 1.5 sec., its output terminal Q issues an H signal and its output terminal $\overline{Q}$ issues an L signal for the new body. Therefore, the NAND gate G2 is supplied with the H input signals and issues an L output signal. The second light-emission stop signal is thus applied to the light emitting unit F1 through the terminal Tb, the transistor Tr1, the monostable multivibrator MM1, the NAND gate G2, the NAND gate G5, the NAND gate G6, and the terminal Te. As the output terminal Q of the monostable multivibrator MM2 always issues the L output signal, the output signal from the NAND gate G4 remains high regardless of whether there is the second light-emission stop signal from the second light control means. While the subject is being photographed, a B signal as a timing clock signal from the timing control circuit 7 in the camera as shown in FIG. 3 is not issued, and a B signal produced during this time is the first light-emission stop signal issued from the first light control means in the camera CA or the light-emission stop signal produced when light is measured by the camera before the subject is photographed and it is determined that no strobe light emission is required. Therefore, strobe light control is effected entirely by the first light control means in the camera CA. The light-emission stop signal issued from the NAND gate G6 is applied to the NAND gate G7 via the inverter INV1. If the time when the light-emission stop signal is applied to the NAND gate G7 falls within 5 m sec. from the starting of strobe light emission, then emitted light has been properly controlled, and if not then emitted light has not been controlled. The result can be confirmed by the light-emitting element LED3 and the sound-producing body N, as described above with respect to (2). Where light control is effected, the transistor Tr7 is alternately energized and de-energized repeatedly so that the second signal A will be of a rectangular waveform having a high level VA1 and an intermediate level VA2, as shown in FIG. 5D, the second signal A being issued from the terminal Ta. To the second signal A, there is added parallel input signals D0 through D4 which have been converted into a serial signal by the shift register SR. Therefore, a signal portion, with a longer period, of the second signal A, that is, a signal generated by the oscillator OSC1 for indicating a light control confirmation, can directly drive the light-emitting element disposed in the viewfinder of the camera, for example. More specifically, the light-emitting element is energized when the second signal A is of a high level VA1, and de-energized when the second signal A is of intermediate and low levels VA2, VA0. A signal portion, with a shorter period, of the second signal A, that is, parallel input signals D0 through D3 shifted in and issued out of the shift register SR by the first signal B (timing clock signal), is converted by the shift register SR and the transistor Tr4 into a serial signal, which is converted by the means as described above. The signal is determined as having an H level by the discriminator circuit in the camera CA when the first signal A is of the high and intermediate levels VA1, VA2, and as having an L level when the first signal A is of the low level VA0, and prescribed control is effected accordingly.

The capability for discriminating the types of cameras mounted on the strobe, i.e., new and old bodies of cameras, will be described. When the mode selector button SB5 selects "R mode", the first signal B is applied to cause the monostable multivibrator MMS serving as a means for discriminating camera types to produce an H signal from its output terminal Q. The transistor Tr2 is then energized to energize the light-emitting element LED1. Inasmuch as the pulse duration of the first signal B is short (about 10 μsec.), the width of pulses generated by the monostable multivibrator MM2 is 1.5 sec., and the monostable multivibrator MM2 is retriggerable, the H signal is actually applied from the output terminal of the monostable multivibrator MM2 to the base of the transistor Tr2, enabling the light-emitting element LED1 to be energized continuously. Where an old body is mounted, the first signal B is not applied, and an L signal is applied to the monostable multivibrator MM1 only when the timer switch SW2 is turned on and off. As a consequence, the light-emitting element LED1 will be de-energized after 1.5 sec. The new and old bodies can thus be discriminated from each other dependent on the manner in which the light-emitting element LED1 is energized.

After the switch SW3 has been turned on, the timer switch SW2 or a first signal B of a voltage VB1 (VB0<VB1) is applied from the terminal Tb, that is, the timer starting terminal of the power supply timer ET is grounded, whereupon the power supply timer ET starts operating. The power supply timer ET will finish its operation upon elapse of a predetermined interval of time (5 minutes) after the timer switch SW2 has been turned off or the second signal B of the voltage VB1 is turned off, whereupon the power supply circuit for supplying the voltage to the various circuits is de-energized.

(4) Where a new body is mounted and "A mode" or "M mode" is selected:

As is understood from the foregoing, when "A mode" is selected, the operation differs from that in "R mode" in that the strobe light is controlled by the strobe control circuit SC in the strobe assembly OS, no parallel-in and serial-out signal conversion is effected by the shift register SR, the light-emitting element on the camera CA for indicating a light control confirmation cannot be energized, and new and old bodies cannot be discriminated from each other.

The operation in "M mode" is different from that in "A mode" in that a light control operation and a light control confirmation are not indicated.

FIGS. 6A and 6B are flowcharts of operation of the strobe control unit F2 shown in FIG. 2. FIG. 6A shows operation in "M mode" and "A mode", while FIG. 6B shows operation in "R mode".

Operation of the strobe control unit F2 will now be described with reference to FIGS. 6A and 6B. Designated at S1 through S71 are steps of the flowcharts. Selection and setting of the switch buttons and switches have already been described, and will not be repeated. When the power supply is switched on in the step S1, the main capacitor in the strobe starts being charged in the step S2. The step S3 determines whether the voltage charged across the main capacitor has reached a prescribed level. If not, then the second signal A transmitted from the terminal Ta to the camera CA is set to VA0 (a signal of substantially zero V) in the step S4. If the charged voltage has reached the desired level, then the second voltage A is set to VA1 (a signal of a higher level, VA1>VA0) in the step S5. After the X contact has been turned on in the step S6, the step S7 re-checks the charging condition of the strobe. If the charged voltage has not reached the desired voltage, the step S8 determines whether the X contact is turned off or not. If turned off, control goes back to the step S3 which checks the charging condition again. If the charging is completed in the step S7, TIMER1=0 in the step S9, and strobe light emission is started in the step S10. Then the step S11 checks if 20 sec. has elapsed after the strobe light emission, that is, after the X contact has been turned on. If 20 μsec. has elapsed, then the second signal A is set to VA0 in the step S12. The step S13 ascertains whether the mode set is "A mode" or not. If "M mode" is set, then the program returns to the step S8. If "A mode" is set, then the step S14 checks if 5 m sec. has elapsed from the strobe light emission. If elapsed, then the program returns to the step S8. If not elapsed, then a light-emission stop signal is issued from the strobe control circuit SC in the strobe assembly OS in the step S15. The strobe then stops its light emission in the step S16, and then the light-emitting element LED3 is energized in the step S17 to indicate light control. If there is no light-emission stop signal upon elapse of 5 m sec. after energized, and operation ends here. If 1 sec. has elapsed in the step 18, then the light-emitting element LED3 energized in "A mode" is de-energized in the step S19 by the monostable multivibrator MM4 which generates a pulse signal for 1 sec. If the X contact is turned off within 1 sec. in the step S20, and 1 sec. has elapsed from light emission in the step S21, then the light-emitting element LED3 is de-energized in the step S22. If 1 sec. has not elapsed, the step S23 checks if the X contact is turned on again. If turned on, the light-emitting element LED3 is de-energized in the step S24, and control goes back to the step S7.

Operation in "R mode" will be described with reference to FIG. 6B. When the power supply in the strobe assembly SO is switched on in the step S25, the strobe starts being charged in the step S26. Within a given period of time (1.5 sec.) after the first signal B comprising clock pulses generated at prescribed intervals has been applied, the step S27 recognizes the camera body irrespectively of whether it is new or old. The step S28 then checks the charging condition of the strobe. If the charging is not yet completed, then the second signal A is set to VA0 in the step S29, and if completed, then the second signal A is set to VA1 (VA1>VA0) in the step S30. Then, if the first signal B is applied as a data request from the camera CA to the connector terminal Tb, TIMER2=0 in the step S32, the camera CA is recognized as a new body in the step S33, and the light-emitting element LED1 is energized. When the first signal B is applied, the shift register SR shifts parallel input signals D0–D3 applied to the parallel input terminals P7–P4 each time L signals are applied to the clock pulse input terminal CK and the preset terminal P/$\overline{S}$ and issues the signals successively out of the output terminal Q8 in the step S34 as a serial signal which is added to the second signal A. If no first signal B as a data request from the camera CA is applied in the step S31, the X contact is turned off in the step S37, and there is no data request from the camera body CA when the value of TIMER2 exceeds 1.5 sec. (which is the time duration of a pulse of the monostable multivibrator MM2), then the step S36 recognizes the camera as an old body, and the program goes back to the step S28. If the X contact is turned on in the step S37, the step S38 checks the charging condition of the strobe. If the charging is not yet completed, then the step S39 ascertains whether the X contact is turned off or not in the step S39. If turned off, control returns to the step S28. If the charging has been completed in the step S38, and the first signal B is set to VB0 in the step S40, then TIMER1=0 in the step S41 and the strobe starts emitting light in the step S42. Then, after elapse of a given time (20 sec.) in the step S43, the second signal A is varied from VA1 to VA0 in the step S44. Within 5 m sec. (step S45) after the strobe has started light emission, the step S46 determines whether the camera is a new body or not. If not, then a light-emission stop signal is generated by the strobe control circuit SC fn the strobe assembly OS in the step S47, and the light emission is stopped in the step S48. The light-emitting element LED3 is energized in the step S49 to indicate light control. If no light-emission stop signal is generated upon elapse of 5 m sec. after strobe light emission, then the light-emitting element LED3 is not energized and operation is finished here. If the new body in the step S46, and the first signal B is applied in the step S50 as a strobe light emission stop signal of a voltage VB1 generated by the strobe control circuit (for example, a light control circuit of a so-called TTL direct photometric system) in the camera CA, then the strobe light emission is stopped in the step S51, a light control signal is issued for 1 sec. in the step S52, and the light-emitting element LED3 is energized in the step S53. If a data request or the first signal B is applied from the camera CA in the step S54, then TIMER2=0 in the step S55, and the step S56 recognizes the camera as a new body. Then, the shift register SR issues a serial signal as added to the second signal A in the step S57, as described above. The step S58 determines with TIMER1 whether 1 sec. has elapsed after the stop of light emission. If elapsed, then the light control signal is stopped in the step S59, and the light-emitting element LED3 is de-energized in the step S60. The program returns to the step S39. If the X contact is turned off in the step S61 within 1 sec. after the strobe light emission has stopped, and the first signal B is applied as a data request signal from the camera CA in the step S62, then TIMER2=0 in the step S63, the step S64 recognizes the camera as a new body, and the shift register SR issues again a serial signal in the step S65. The step S66 then ascertains with TIMER whether 1 sec. has elapsed after the stop of light emission. If elapsed, the light control signal is stopped in the step S67, and the light-emitting element LED3 is de-energized in the step S68. If the X contact is turned on again before 1 sec. elapses in the step S69, the monostable multivibrator MM4 is reset in the step S70 and the light-emitting element LED3 is de-energized in the step S71. Thereafter, the program goes back to the step S38 to check if the charging has been completed, and the foregoing operation is repeated.

With the above arrangement, many pieces of information can be transmitted through three connector terminals by which the camera CA is connected to the strobe assembly OS composed of the strobe control unit F2 and the light-emitting unit F1. More specifically, the timing clock signal as the first signal B generated in the camera CA for reading strobe information, and the strobe light emission stop signal are received from the terminal Tb, and the strobe charging completion signal D0, the new/old strobe discriminating signal D1, the F-number setting signals D2, D3 for the program mode are produced in the strobe assembly OS and converted into a serial signal as the second signal A, which can be issued through the first signal transmission path, i.e., a single terminal (single wire), to the camera CA. Accordingly, the strobe assembly and the camera can be interconnected by the hot-shoe arrangement while allowing many items of information to be transmitted therebetween, without lowering the simplicity and compatibility.

When the strobe assembly OS is in M mode, the light emission from the strobe is not controlled. When in A mode, light control and light control confirmation are carried out by the second light-emission stop signal from the strobe control circuit SC serving as the second light control means in the strobe assembly OS. When in R mode the first signal B is received from the camera CA through the terminal Tb, a first light-emission stop signal is supplied from the first light control means in the camera CA for light control and light control confirmation. The light control effected by the camera CA is of a higher accuracy than the light control by the strobe assembly OS since the light control by the camera CA is based on measurement of light reflected onto the film surface. The light control by the camera CA is also advantageous in that no exposure conditions are required to be changed when the photographic lens is replaced. With the above embodiment, when the camera CA which produces the first signal B in R mode, light control is automatically effected by the camera CA. Therefore, it is not necessary to change modes and effect exposure correction due to lens replacement after the type of the camera CA has been discriminated, with the result that complexities and errors in operation can be reduced.

The strobe control unit F2 is responsive to the first signal B for starting (and restarting) the power supply timer ET, energizing the light-emitting element LED2 for indicating timer operation, and energizing the light-emitting element LED1 for discriminating new/old bodies. The power supply timer ET is composed of 5-minute timer, and it is started and restarted by the first signal B and the power supply remains turned on upon use of the strobe simply by turning on the main switch SW3. Upon elapse of 5 minutes after the strobe has not been used (after the first signal B has not been applied), the power supply is automatically turned off. Therefore, it is unnecessary to repeat any frequent turning on and off of the main switch, resulting in a simple operation. Even if the user forgets to turn off the main switch, unwanted consumption of the battery can be prevented. When an old body is used, the power supply timer ET will operate in the same manner as when the B signal is applied if the timer switch SW2 is turned on (and may then be turned off). If it is desired to use the power supply for more than 5 minutes, the switch SW2 should be turned on again. Whether the power supply timer Et is in operation or not can be confirmed by the light-emitting element LED2 on the rear housing wall of the strobe assembly OS. The necessity of actuation of the switches can be recognized at a glance. When the strobe is no longer in use, the main switch SW3 should be turned off at once to reduce the consumption of the battery.

Inasmuch as the compatibility with conventional camera (old bodies) is assured, there might be instances in which it would be difficult to discriminate new and old bodies. However, whether or not the first signal B is applied or not is determined by the monostable multivibrator MM2 which will energize the light-emitting element LED1, so that new and old bodies can be distinguished clearly from each other, and operation errors will be prevented in advance.

The strobe assembly OS has the light-emitting element LED4 for indicating the completion of strobe charging, and the light-emitting element LED3 and the sound-producing body N for confirming strobe light control, whereby the above information can be indicated on the strobe assembly in addition to indications on the camera CA. This is particularly advantageous when the strobe is mounted on an old camera body.

Figure 7A:
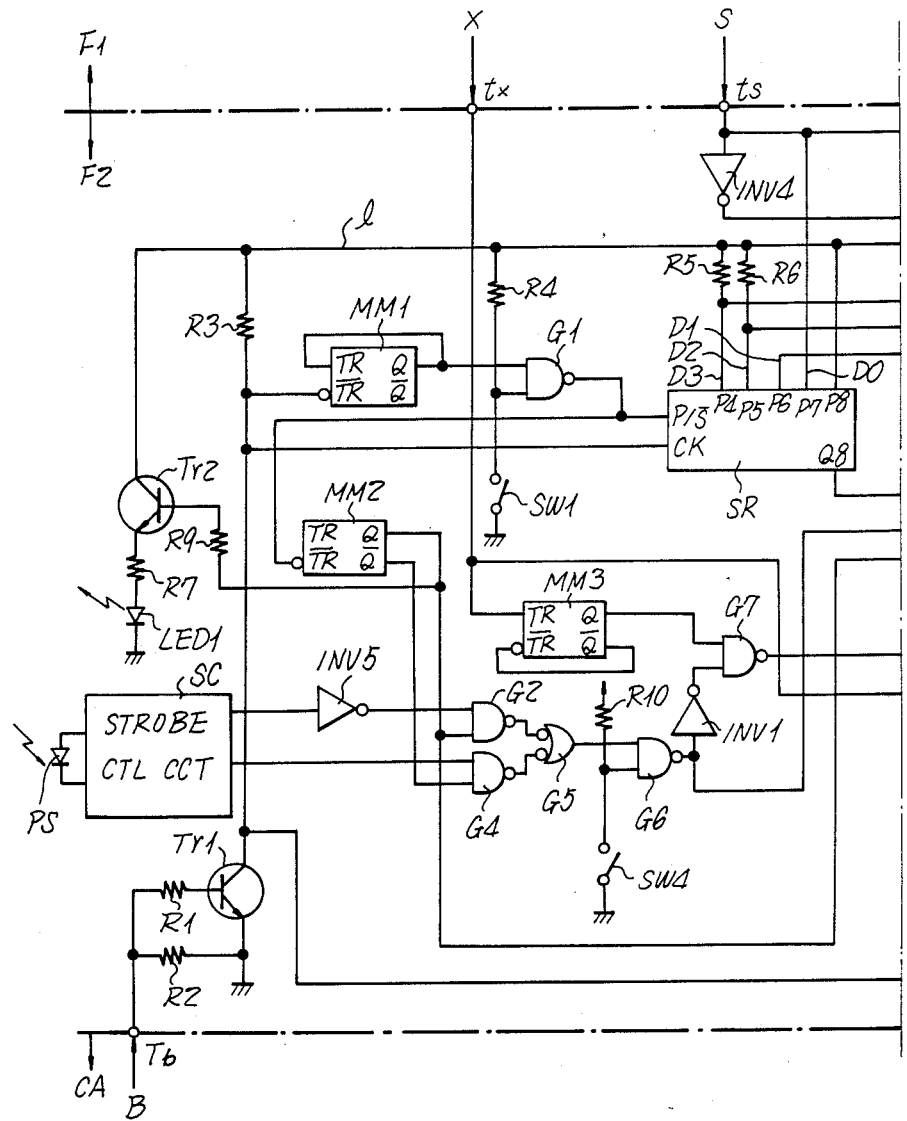
FIG. 7 is a circuit diagram of a circuit arrangement of an electronic flash photographing system according to another embodiment of the present invention.

FIG. 7 shows another embodiment of the present invention, in which one of input terminals of a NAND gate G2 is connected through an inverter INV5 to the collector of a transistor Tr1 in a strobe control unit F2.

Figure 8:
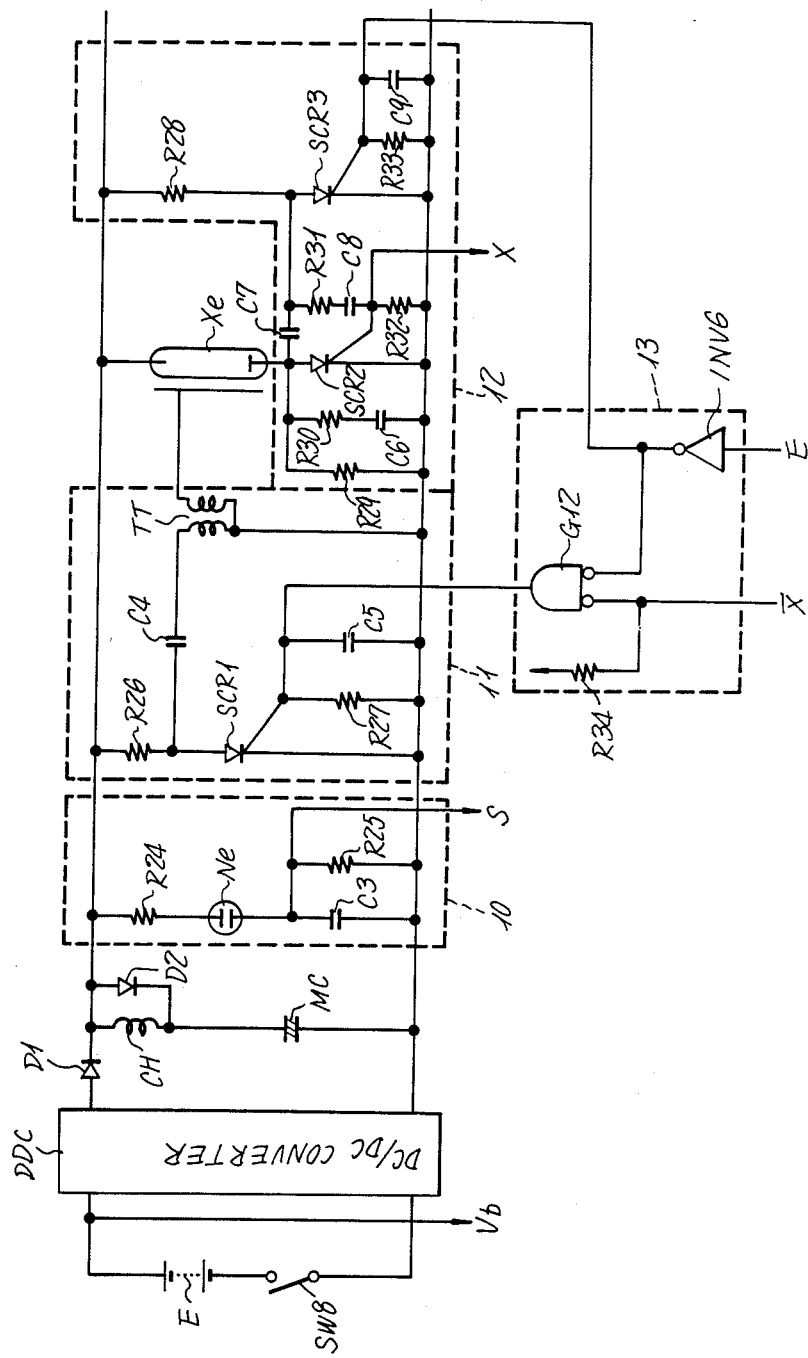
FIG. 8 is a circuit diagram of a strobe light-emitting unit according to the present invention.

FIG. 8 illustrates a strobe light-emitting unit F1 and a control means for controlling the light-emitting unit F1 in response to a light-emission start signal, a light-emission stop signal, and a light-emission inhibit signal supplied from a camera.

A power supply E is connected to a DC/DC converter DDC through a power supply switch SW8 controlled by a power supply timer ET when a main switch SW3 and a timer switch SW2 in the strobe control unit F2 are turned on. The DC/DC converter DDC serves to boost the voltage of the power supply E. The boosted voltage is rectified by a rectifying diode D1 and the rectified voltage is supplied through a parallel-connected circuit of a choke coil CH and a diode D2 to a main capacitor MC, which is charged up to a voltage high enough to energize the strobe to emit light. The charged condition of the main capacitor MC is detected by a charging completion detector 10 comprising a series-connected circuit composed of a resistor R24, a neon bulb Ne, and a resistor R25 shunted by a capacitor C3. More specifically, when the main capacitor MC has been charged completely, a charging completion signal S is generated from a junction between the neon bulb Ne and the resistor R25 and transmitted to a terminal ts, and at the same time the neon bulb Ne is energized to allow the user to visually recognize that the main capacitor MC has been charged.

A trigger circuit 11 is connected to a power supply line to which is applied the voltage boosted by the DC/DC converter DDC and rectified by the diode D1. Between the power supply line and ground, there is connected a series-connected circuit composed of a resistor R26 and thyristor SCR1. A series-connected circuit comprising a trigger capacitor Cr and a primary winding of a trigger transformer TT is connected between ground and a junction between the resistor R26 and the thyristor SCR1. The trigger transformer TT has a secondary winding with one end thereof coupled to a junction between the primary winding thereof and ground, the secondary winding having an opposite end connected to a trigger electrode of a xenon discharge tube Xe. Between the gate of the thyristor SCR1 and ground, there is connected a parallel-connected circuit comprising a resistor R27 and a capacitor C5.

Designated at 12 is a known light-emission stop circuit having a series-connected circuit composed of the xenon discharge tube Xe and a thyristor SCR2 and connected between the power supply line and ground, and a series-connected circuit comprising a resistor R28 and a thyristor SCR3. The thyristor SCR2 is shunted by a resistor R29, a series-connected circuit composed of a resistor R30 and a capacitor C6, and a series-connected circuit composed of a commutation capacitor C7, a resistor R31, a capacitor C8, and a resistor R32. The thyristor SCR2 has a gate connected to a junction between the capacitor C8 and the resistor R32 and also to a terminal tx for transmitting an X contact responsive signal X. Between the gate of the thyristor SCR3 and ground, there is connected a parallel-connected circuit of a resistor R33 and a capacitor C9. The thyristor SCR3 has an anode connected to a junction between the commutation capacitor C7 and the resistor R31.

A control circuit 13 serves as a control means for controlling the light-emitting unit F1 in response to a light-emission start signal $\bar{x}$ generated from the camera CA and light-emission stop and inhibit signals as an effective stop signal E. The control circuit 13 is composed of a NOR gate G12, an inverter INV6, and a pullup resistor R34. One input terminal of the NOR gate 12 is normally supplied with an H signal through the pullup resistor R34. When the X contact on the camera CA is turned on, the input terminal of the NOR gate 12 is supplied with an L signal. The other input terminal of the NOR gate 12 is supplied with an effective stop signal E through the inverter INV6. The NOR gate 12 has an output terminal connected to the gate of the thyristor SCR1, and the inverter INV6 has an output terminal coupled to the other input terminal of the NOR gate 12 and to the gate of the thyristor SCR3.

The other components of the embodiment shown in FIGS. 7 and 8 are the same as those of the previous embodiment. Now, operation of the embodiment of FIGS. 7 and 8 will be described.

(1) Where an old body is mounted and "M mode" is selected:

When the foot of the strobe assembly CA is mounted on a hot-shoe type accessory shoe, for example, of the old body, at least a synchro terminal of the old body and the terminal $\overline{Tx}$ of the strobe control unit F2 are interconnected. When the mode selector button SB3 selects "M" the switch SW1 is turned on and the switch SW4 is turned on. By sliding the main switch button SB1 from the off position to the on position and depressing the timer switch button SB2, the main switch SW3 and the timer switch SW2 are turned on to energize the power supply timer ET for applying a power supply control signal P from its output terminal via the terminal tp to cause the power supply E in the light-emitting unit F1 of FIG. 6 to apply a power supply voltage to the circuits in the light-emitting unit F1 (such as the DC/DC converter, the main capacitor MC charging circuit, the trigger circuit 11, and the like), and a power supply voltage Vb is applied via the terminal tv to the power supply line. As the power supply timer ET is started, the transistor Tr5 is simultaneously rendered conductive to energize the light-emitting element LED2 which indicates timer operation to show that the power supply voltage is applied to the various circuits.

When the various circuits are supplied with the power supply voltage by the power supply control signal P, the main capacitor MC in the light-emitting unit F1 starts being charged. While the charged voltage across the main capacitor is lower than a prescribed voltage, the strobe charging completion signal S issued from the charging completion detector 10 is at the L level, and the transistor Tr4 with its base supplied with the L-level strobe charging completion signal S via the terminal ts is kept de-energized. Therefore, the light-emitting element LED4 for indicating the completion of strobe charging is not energized. When the main capacitor is charged up to the prescribed level, the neon bulb Ne is energized and the strobe charging completion signal S goes high to energize the transistor Tr4 for thereby energizing the light-emitting device LED4. Therefore, the user now knows that the strobe is capable of emitting light.

When the timer switch SW2 is turned on and then turned off again, the clock pulse input terminal CK of the shift register SR and the input terminal $\overline{TR}$ of the monostable multivibrator MM1 are supplied with a signal of an L level. However, since the mode changeover switch SW1 is tuned on, the preset input terminal $\overline{P/S}$ is supplied with a signal of an H level only. The shift register SR does not shift parallel input signals, but issues out a signal of the input terminal P7 at the first stage (LSB), that is, the H-level strobe charging completion signal S, from the output terminal Q8, the signal being applied to one of the input terminals of the NAND gate G11. Inasmuch as the other input terminal of the NAND gate G11 is supplied with the H signal from the NAND gate G10, the output of the NAND gate G11 goes low to energize the transistor Tr3. Since the transistor Tr7 connected in series with the transistor Tr3 has been energized with its base supplied with an H signal from the oscillator OSC1 which has stopped its oscillating operation, the terminal Ta issues the second signal A having a voltage VA1 from the time of the charging completion. Therefore, as long as the old body has a terminal receptive of a charging completion signal, the user can recognize the charging completion through the camera based on the second signal A.

(2) Where an old body is mounted and "A mode" is selected:

In this mode, the system operates substantially in the same manner as the above mode (1). Since the automatic/manual selector switch SW4 is turned off by selecting "A mode" with the mode selector button SB5, however, the functions of light control and light control confirmation are activated. The light control and light control confirmation will be described with reference to FIGS. 7, 8 and 9. With the strobe main capacitor MC charged up to the prescribed level, the light-emission signal $\overline{x}$ from the camera CA (which is generated as by closing the X contact) is supplied through the strobe control unit F2 and the control circuit 13 in the strobe light-emitting unit F1 to the light-emitting unit F1 to emit strobe light. Simultaneously with the strobe light emission, the X contact responsive signal X is supplied from the junction between the capacitor C8 and the resistor R32 in the light-emitting unit F1 through the terminal tx to the strobe control unit F2 for a short period of time such as 10 μsec. This signal is applied to the input terminal TR of the monostable multivibrator MM3 and the reset terminal R of the monostable multivibrator MM4. The monostable multivibrator MM3 applies an H signal to one of the input terminals of the NAND gate G7 for 5 m sec. As light is emitted from the strobe, light (including natural light) reflected by the subject is detected by the light detector PS in the strobe assembly F2. When the amount of detected light has achieved the preset value of the integrator in the strobe control circuit SC, the light-emission stop signal is applied through the inverter INV6 in the control circuit 13 to the light-emitting stop circuit 12 in the light-emitting unit F1, whereupon the light emission from the xenon discharge tube Xe is interrupted for automatic control of strobe light emission. More specifically, the strobe control circuit SC applies the light-emission stop signal (H signal) to one of the input terminals of the NAND gate G4. As the other input terminal of the NAND gate G4 is also high, the NAND gate G4 issues an L signal. The NAND gate G2 issues an H signal since its two input terminals are low. With the H and L signals applied from the NAND gates G2, G4, the NAND gate G5 applies an H signal to the NAND gate G6 which then produces an L output signal. The L signal from the NAND gate G6 is applied as the light-emission stop signal via the terminal te to the light-emitting unit F1. The light-emission stop signal applied to the light-emitting unit F1 is inverted by the inverter INV6 in the control circuit 13 into an H signal, which is applied to the gate of the thyristor SCR3 in the light-emission stop circuit. The thyristor SCR3 is turned on to discharge the commutation capacitor C7 to reversebias the cathode and gate of the thyristor SCR2, which is immediately turned off to stop light emission from the xenon discharge tube Xe. The L output signal from the NAND gate G6 is inverted by the inverter INV1 into an H signal, which is applied to one of the input terminals of the NAND gate G7. If the time when the H signal is applied to the other input terminal of the NAND gate G7, i.e., when the light-emission stop signal is generated, falls within 5 m sec. from the time when the strobe starts emitting light (within the time in which a pulse is generated by the monostable multivibrator MM3), then an L signal is issued by the NAND gate G7 to oscillate the oscillators OSC1, OSC2 for 1 sec. and to render the transistor Tr6 conductive for energizing the light-emitting element LED3 (for 1 sec.) to allow the user to confirm that light from the strobe is controlled properly. The oscillation (at 4 Hz) of the oscillator OSC1 causes the transistor Tr7 to be alternately energized and de-energized repeatedly at a prescribed period. Since the transistor Tr3 has been de-energized as the charging completion signal S is at an L level, the second signal A issued from the terminal Ta is of a voltage VA0 (VA1>VA0). The oscillator OSC2 is also alternately energized and de-energized at a prescribed period (4 KHz) for 1 sec. to drive the sound-producing body N, the user can also confirm the light control with sounds. If the sounds are not desirable for some reasons, then the switch SW5 may be turned off. No light-emission stop signal from the strobe control circuit SC within 5 m sec. after the strobe light emission means that the amount of light emitted from the strobe does not reach an adequate amount of light. Therefore, if the time when the light-emission stop signal generated by the strobe control circuit SC is supplied as an H signal to the NAND gate G7 via the NAND gates G4, G5, G6 and the inverter INV1 exceeds the period of time (5 m sec.) during which the H signal from the monostable multivibrator MM3 upon strobe light emission is supplied to the NAND gate G7, then the input signal applied to the monostable multivibrator MM4 goes high to cause the output terminal Q thereof to produce an L output signal. Thus, the light-emitting element LED and the sound-producing body N are not energized, so that the user can recognize that the strobe has not been subjected to light control and hence the subject has been photographed with an underexposure.

While the foregoing operation is effected with "A mode" selected, substantially the same operation as above will be carried out if the strobe assembly is mounted on an old body and "R mode" is selected.

(3) Where a new body is mounted and "R mode" is selected:

When the camera CA is of a new body, the first signal B of voltages VB1, VB0 is applied at a prescribed interval (10 μsec. at minimum) from the B-signal generator 9 in the camera CA to the connector terminal Tb. Therefore, the transistor Tr1 supplied with the first signal B at its base is alternately energized and de-energized repeatedly. When the transistor Tr1 is turned on, the collector potential is lowered to apply an L signal to the input terminal $\overline{TR}$ of the monostable multivibrator MM1 and the clock pulse input terminal CK of the shift register SR. The output terminal Q of the monostable multivibrator MM1 then issues an H output signal to the NAND gate G1 to apply an L signal to the preset input terminal P/$\overline{S}$ of the shift register SR for a fixed period of time (500 μsec.). The shift register SR is then placed into a serial mode in which parallel input signals can be shifted. When a signal which turns from L to H (a clock pulse) is applied to the clock pulse input terminal CK during this mode, the shift register SR first shifts an H-level strobe charging completion signal D0, for example, applied to the parallel input terminal P7 and issues the shifted signal out of the output terminal Q8. When a next clock pulse is applied to the input terminal CK, an L-level new/old strobe discriminating signal D1 (the L level indicates a new strobe) is issued out of the output terminal Q8. Likewise, F-number setting signals D2, D3 (in FIG. 7, D2=H, D3=H, indicating F=5.6) are successively delivered out of the output terminal Q8 to one of the input terminals of the NAND gate G11. Since the other input terminal of the NAND gate G11 is supplied with the H input signal from the NAND gate G10, the output terminal of the NAND gate G11 issues an encoded signal corresponding to a serial signal (L or H signal) from the output terminal Q8 of the shift register SR to energize and de-energize the transistor Tr3. As the transistor Tr7 connected in series with the transistor Tr3 has been energized, the serial signal becomes the second signal A issued out through the terminal Ta. Although not shown, the encoded serial signal in the camera CA is applied to a discriminator means and converted by a series-to-parallel converting circuit back into a parallel signal, which is latched and decoded by a decoder for effecting indications and control. For example, the F-number setting signals D2, D3 are decoded to change a program diagram corresponding to the F number at the time of program exposure control.

The functions of light control and light control confirmation will be described. It is assumed that a light-emission signal $\overline{x}$ has been applied to the light-emitting unit F1 to emit strobe light and that an X contact responsive signal X has been applied from the light-emitting unit F1 to the monostable multivibrators MM3, MM4. The camera CA which is of a new body has a light control means (corresponding to the second light detector DSPD and the integrator 8 shown in FIG. 3) for detecting strobe light reflected onto the film surface when the subject is photographed and issuing a light-emission stop signal to the strobe assembly OS. Now, the light control means in the camera CA will be referred to as a first light control means, the light detector PS and the strobe control circuit SC in the strobe assembly OS as a second light control means, and light-emission stop signals generated by the first and second light control means as first and second light-emission stop signals, respectively.

Figure 9:
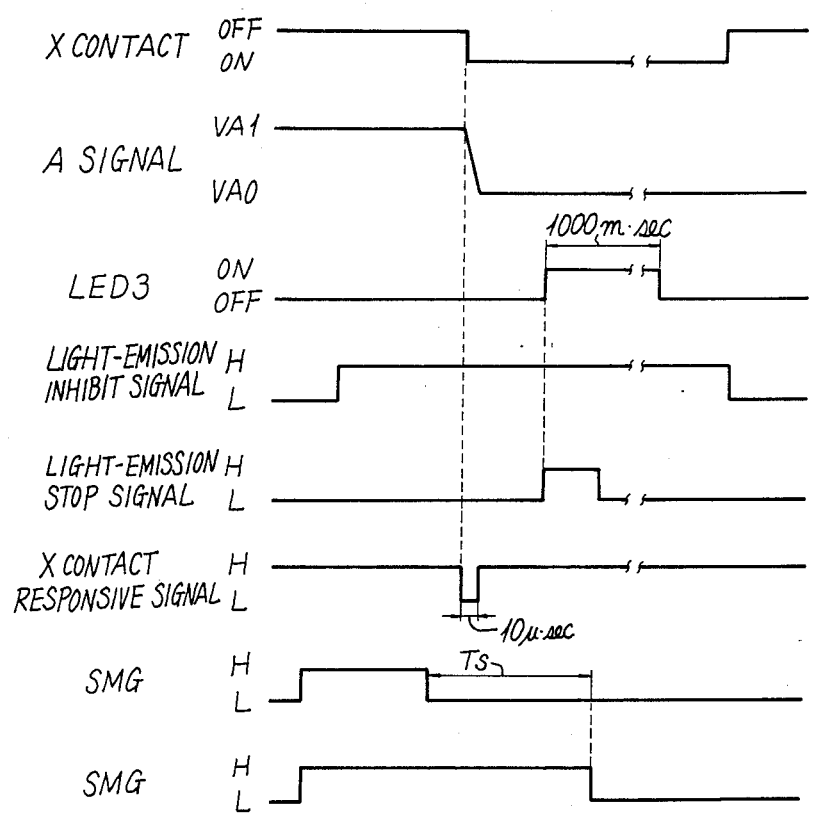
FIG. 9 is a timing chart of output signals produced in the circuit arrangement shown in FIG. 7. cl DESCRIPTION OF THE PREFERRED EMBODIMENTS

As strobe light emission is started, the first and second light control means begin integrating strobe light. When the amounts of light detected by the first and second light control means reach preset values of integrators, the first light control means applies a first light-emission stop signal (B signal) of an H level, from the B-signal generator 9 in the camera body CA through the terminal Tb to the base of the transistor Tr1. The second light control means applies a second light-emission stop signal of an H level to one of the input terminals of the NAND gate G4 in the strobe control unit F2. At this time, the transistor Tr1 is energized to render the other input signal of the NAND gate G2 high through the inverter INV5 and also render the output signal from the monostable multivibrator MM1 high for a short period of time (500 μsec.). Since the monostable multivibrator MM2 is retriggerable and has a long pulse duration of 1.5 sec., its output terminal Q issues an H signal and its output terminal $\overline{Q}$ issues an L signal for the new body. Therefore, the NAND gate G2 is supplied with the H input signals and issues an L output signal. The second light-emission stop signal is thus applied through the terminal Tb, the transistor Tr1, the inverter INV5, the NAND gate G2, the NAND gate G5, the NAND gate G6, and the terminal Te and also through the control circuit 13 in the light-emitting unit F1 to the light-emission stop circuit 12. As the output terminal Q of the monostable multivibrator MM2 always issues the L output signal, the output signal from the NAND gate G4 remains high regardless of whether there is the second light-emission stop signal from the second light control means. While the subject is being photographed, a B signal as a timing clock signal from the timing control circuit 7 in the camera as shown in FIG. 3 is not issued, and a B signal produced during this time is the first light-emission stop signal issued from the first light control means in the camera CA or the light-emission stop signal produced when light is measured by the camera before the subject is photographed and it is determined that no strobe light emission is required. Therefore, strobe light control is effected entirely by the first light control means in the camera CA. The light-emission stop signal issued from the NAND gate G6 is applied to the NAND gate G7 via the inverter INV1. If the time when the light-emission stop signal is applied to the NAND gate G7 falls within 5 m sec. from the starting of strobe light emission, then emitted light has been properly controlled, and if not then emitted light has not been controled. The result can be confirmed by the light-emitting element LED3 and the sound-producing body N, as described above with respect to (2). Where light control is effected, the transistor Tr7 is alternately energized and de-energized repeatedly so that the second signal A will be of a rectangular waveform having a high level VA1 and an intermediate level VA2, as shown in FIG. 9, the second signal A being issued from the terminal Ta. To the second signal A, there is added parallel input signals D0 through D4 which have been converted into a serial signal by the shift register SR. Therefore, a signal portion, with a longer period, of the second signal A, that is, a signal generated by the oscillator OSC1 for indicating a light control confirmation, can directly drive the light-emitting element disposed in the viewfinder of the camera, for example. More specifically, the light-emitting element is energized when the second signal A is of a high level VA1, and de-energized when the second signal A is of intermediate and low levels VA2, VA0. A signal portion, with a shorter period, of the second signal A, that is, parallel input signals D0 through D3 shifted in and issued out of the shift register SR by the first signal B (timing clock signal), is converted by the shift register SR and the transistor Tr4 into a serial signal, which is converted by the means as described above. The signal is determined as having an H level by the discriminator circuit in the camera CA when the first signal A is of the high and intermediate levels VA1, VA2, and as having an L level when the first signal A is of the low level VA0, and prescribed control is effected accordingly.

The capability for inhibiting strobe light emission will be described. Light reflected from the subject and detected by the first light detector ASPD shown in FIG. 1 is measured by the photometric circuit 1, and digitized by the A/D converter 2. Then, the arithmetic and storage circuit 3 determines whether the reflected light is intensive enough not to justify strobe light emission, or whether overexposure will result from strobe light emission. If no strobe light is required, then the light-emission inhibit signal as shown in FIG. 9 is applied to the terminal Tb through the B-signal generator 9 under a command from the timing control circuit 7 at least from a time immediately before the X contact is turned on to a time immediately after the X contact is turned off. The light-emission inhibit signal (effective stop signal E) is applied to the strobe light-emitting unit F1 through the transistor Tr1, the inverter INV5, the NANS gate G2, the NAND gate G5, the NAND gate G6, and the terminal te, as described above. The light-emission inhibit signal is then inverted by the inverter INV6 in the control circuit 13 into an H signal which is applied to one of the input terminals of the NOR gate G12. Under this condition, the output signal of the trigger circuit 11 remains low even when an L-level light-emission start signal $\bar{x}$ is applied from the camera CA to the other input terminal of the NOR gate G12, so that the thyristor SCR1 in the trigger circuit 11 is not energized, and the xenon discharge tube Xe is inhibited from emitting light. In case no light-emission inhibit signal is issued from the camera CA, the effective stop signal E is normally high, and is inverted by the inverter INV6 into an L signal applied to one of the input terminals of the NOR gate G12. Therefore, when the L-level light-emission start signal is applied from the camera CA to the other input terminal of the NOR gate G12, the NOR gate G12 issues an H signal which is fed to the gate of the thyristor SCR1 in the trigger circuit 11, whereupon the xenon discharge tube Xe starts emitting light.

(4) Where a new body is mounted and "A mode" or "M mode" is selected:

As is understood from the foregoing, when "A mode" is selected, the operation differs from that in "R mode" in that the function of inhibiting strobe light emission is inactivated, the strobe light is controlled by the strobe control circuit SC in the strobe assembly OS, no parallel-in and serial-out signal conversion is effected by the shift register SR, the light-emitting element on the camera CA for indicating a light control confirmation cannot be energized, and new and old bodies cannot be discriminated from each other.

The operation in "M mode" is different from that in "A mode" in that a light control operation and a light control confirmation are not indicated.

With the above embodiment, when the light-emission inhibit signal generator means in the camera CA measures light reflected from the subject and determines that no strobe light is required before the subject is photographed, a light-emission inhibit signal is applied to the light-emitting unit F1 to prevent the strobe from emitting light even if the X contact is turned on while the subject is being photographed. Accordingly, undesired consumption of the strobe power supply due to unwanted strobe light emission can be prevented.

Generally, when the camera is set in a strobe photographic mode, the shutter speed is fixed at a certain value (for example, 1/250 sec.), and an overexposure may result upon emission of light from the strobe. However, such an improper exposure can be prevented by inhibiting strobe light emission.

Since whether strobe light should be emitted or not is determined by the light-emission inhibit signal generator means, anyone who is not not a skilful camera user does not tend to operate the camera in error. As no manual switching is necessary, the camera can be handled with greater ease.

According to the present invention, furthermore, no new signal transmission path is required, but the existing transmission path for the light-emission stop signal can be employed for transmitting the light-emission inhibit signal from the camera CA to the strobe assembly OS. As a result, the system of the invention does not involve any substantial cost increase.

The present invention is not limited to the foregoing embodiments, but may be modified in various ways within the scope and spirit thereof.

For example, the parallel-to-serial converting means is not restricted to the shift register, but may comprise other means having the same function. The pulse lengths or durations of the monostable multivibrators are not limited to the illustrated numerical values.

Furthermore, the light-emission inhibit signal generator means is not limited to the foregoing embodiment. For a camera having television photographing mode capable of photographing images displayed on a television receiver or CRT, a light-emission inhibit signal may be generated by the B-signal generator 9 in response to selection of the television photographing mode.

Although certain preferred embodiments have been shown and described, it should be understood that many changes and modifications may be made therein without departing from the scope of the appended claims.

What is claimed is:

1. An electronic flash photographing system comprising:
   (a) a camera;
   (b) a flash unit separate from said camera;
   (c) a first signal transmission path for transmitting a signal from said camera to said flash unit; and
   (d) a second signal transmission path for transmitting a signal from said flash unit to said camera;
   (e) said camera having means for generating and transmitting a timing clock signal to said first signal transmission path and for stopping generation of the timing clock signal or interrupting transmission of the timing clock signal to said first signal transmission path at least when a subject is photographed by said camera, and light control means for detecting the integrated flash light generated by said flash unit and reflected from the subject being photographed and for generating and transmitting a light-emission stop signal to said first signal transmission path when an integrated value of the detected flash light reaches a preset value;
   (f) said flash unit having means for converting a plurality of information signals into a serial signal in synchronism with the timing clock signal from said first signal transmission path, said flash unit being responsive to the light-emission stop signal from said first signal transmission path for stopping light emission; and
   (g) said flash unit having second light control means for detecting and integrating flash light reflected from the subject and generating a light-emission stop signal when an integrated value of the detected flash light reaches a preset value, and light-control selector means for applying the light-emission stop signal to light-emission stop means from said first signal transmission path with priority over the light-emission stop signal from said second light control means, when the timing clock is received from said first signal transmission path.

2. An electronic flash photographing system comprising:
   (a) a camera;
   (b) a flash unit separate from said camera;
   (c) a first signal transmission path for transmitting a signal from said camera to said flash unit; and
   (d) a second signal transmission path for transmitting a signal from said flash unit to said camera;
   (e) said camera having means for generating and transmitting a timing clock signal to said first signal transmission path and for stopping generation of the timing clock signal for interrupting transmission of the timing clock signal to said first signal transmission path at least when a subject is photographed by said camera, and light control means for detecting the integrated flash light generated by said flash unit and reflected from the subject being photographed and for generating and transmitting a light-emission stop signal to said first signal transmission path when an integrated value of the detected flash light reaches a preset value;
   (f) said unit having means for converting a plurality of information signals into a serial signal in synchronism with the timing clock signal from said first signal transmission path, said flash unit being responsive to the light-emission stop signal from said first signal transmission path for stopping light emission; and
   said camera having means for transmitting a light-emission start signal to a signal transmission path, and means for transmitting a light-emission inhibit signal to said first signal transmission path when it is determined, at least before said light-emission start signal is generated, that no light emission is required from said flash unit, said flash unit having means for starting to emit light in response to the light-emission start signal from said last-mentioned signal transmission path and for inhibiting light emission in response to said light-emission start signal from said last-mentioned signal transmission path while the light-emission inhibit signal is being received from said first signal transmission path.

* * * * *